US012134095B2

(12) United States Patent
Paredes

(10) Patent No.: US 12,134,095 B2
(45) Date of Patent: Nov. 5, 2024

(54) APPARATUS AND METHODS FOR PERFORMING MICROFLUIDIC-BASED BIOCHEMICAL ASSAYS

(71) Applicant: SiPhox, Inc., Burlington, MA (US)

(72) Inventor: Armando Paredes, Lincoln, MA (US)

( * ) Notice: Subject to any disclaimer, the term of this patent is extended or adjusted under 35 U.S.C. 154(b) by 0 days.

(21) Appl. No.: 18/121,712

(22) Filed: Mar. 15, 2023

(65) Prior Publication Data

US 2023/0264195 A1 Aug. 24, 2023

Related U.S. Application Data

(60) Provisional application No. 63/302,365, filed on Jan. 24, 2022.

(51) Int. Cl.
*B01L 3/00* (2006.01)

(52) U.S. Cl.
CPC ... *B01L 3/502715* (2013.01); *B01L 2200/025* (2013.01); *B01L 2200/16* (2013.01); *B01L 2300/0654* (2013.01); *B01L 2300/0883* (2013.01); *B01L 2400/0406* (2013.01); *B01L 2400/08* (2013.01)

(58) Field of Classification Search
CPC ......... B01L 3/502715; B01L 2200/025; B01L 2200/16; B01L 2300/0654; B01L 2300/0883; B01L 2400/0406; B01L 2400/08
See application file for complete search history.

(56) References Cited

U.S. PATENT DOCUMENTS

| | | | | |
|---|---|---|---|---|
| 6,418,968 | B1 * | 7/2002 | Pezzuto | F16K 99/0057 137/833 |
| 11,097,268 | B2 | 8/2021 | Sells | |
| 11,440,008 | B2 | 9/2022 | Mourey | |
| 2004/0051154 | A1 * | 3/2004 | Yamakawa | B01L 3/502753 257/414 |
| 2004/0203136 | A1 * | 10/2004 | Kellogg | B01F 25/433 435/287.2 |

(Continued)

FOREIGN PATENT DOCUMENTS

WO WO-2021053637 A1 * 3/2021 .......... A61M 11/007

OTHER PUBLICATIONS

Levy ("On-chip microfluidic tuning of an optical microring resonator"). Appl. Phys. Lett. Mar. 13, 2006; 88 (11): 111107. https://doi.org/10.1063/1.2182111 (Year: 2006).*

*Primary Examiner* — Jennifer Wecker
*Assistant Examiner* — Jonathan Bortoli
(74) *Attorney, Agent, or Firm* — Caldwell Intellectual Property Law

(57) ABSTRACT

An apparatus for performing microfluidic-based biochemical assays, the apparatus includes a microfluidic device, wherein the microfluidic device comprises at least a microfluidic feature comprising at least a reservoir configured to contain at least a fluid, and at least an alignment feature for positioning and attaching a sensor device, wherein the at least an alignment feature is not contacting the at least a microfluidic feature, at least a sensor device configured to be in sensed communication with the at least a fluid and detect at least a sensed property, and at least a flow component fluidically connected to the at least a microfluidic feature configured to flow the at least a fluid through the at least a sensor device.

18 Claims, 36 Drawing Sheets

(56) References Cited

U.S. PATENT DOCUMENTS

| | | | | |
|---|---|---|---|---|
| 2004/0228764 | A1* | 11/2004 | Stephens | B01L 3/502723 422/68.1 |
| 2006/0257992 | A1* | 11/2006 | McDevitt | B01L 9/527 435/287.2 |
| 2008/0273918 | A1* | 11/2008 | Linder | B01L 3/502761 403/31 |
| 2009/0226127 | A1* | 9/2009 | Heideman | B01L 3/5027 385/12 |
| 2013/0193003 | A1* | 8/2013 | Reed | G01N 27/4148 438/49 |
| 2022/0048026 | A1 | 2/2022 | Choy | |
| 2023/0012094 | A1 | 1/2023 | Dubrovsky | |

* cited by examiner

APPARATUS AND METHODS FOR PERFORMING MICROFLUIDIC-BASED BIOCHEMICAL ASSAYS

CROSS-REFERENCE TO RELATED APPLICATIONS

This application claims the benefit of priority of U.S. Provisional Patent Application Ser. No. 63/302,365, filed on Jan. 24, 2022, and titled "MICROFLUIDICS CARTRIDGE FOR OPTICAL SENSOR CHIPS," which is incorporated by reference herein in its entirety.

FIELD OF THE INVENTION

The present invention generally relates to the field of performing microfluidics-based biochemical assays. In particular, the present invention is directed to an apparatus and methods for performing microfluidic-based assays.

BACKGROUND

Biosensors utilizing microfluidics and integrated sensors could be beneficial over currently used analytical methods for use in rapid, point-of-care medical diagnosis as well as other bioassays. Thus, new methods/systems to perform assays in microfluidic systems are needed.

SUMMARY OF THE DISCLOSURE

In an aspect, an apparatus for performing microfluidic-based biochemical assays is described. The apparatus includes a microfluidic device, wherein the microfluidic device comprises at least a microfluidic feature comprising at least a reservoir configured to contain at least a fluid, and at least an alignment feature for positioning and attaching a sensor device, wherein the at least an alignment feature is not contacting the at least a microfluidic feature, at least a sensor device configured to be in sensed communication with the at least a fluid and detect at least a sensed property, and at least a flow component fluidically connected to the at least a microfluidic feature configured to flow the at least a fluid through the at least a sensor device.

In another aspect, a method for performing microfluidic-based biochemical assays is described. The method includes positioning, using at least an alignment feature of a microfluidic device, at least a sensor device, wherein the microfluidic device further comprises at least a microfluidic feature comprising at least a reservoir configured to contain at least a fluid, and the at least an alignment feature is not contacting the at least a microfluidic feature, flowing, using at least a flow component connected with the at least a microfluidic feature, the at least a fluid through the at least a sensor device, and detecting, using the at least a sensor device configured to be in sensed communication with the at least a fluid, at least a sensed property.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for performing microfluidic-based biochemical assays. In an embodiment, the apparatus comprises a microfluidic device containing at least a microfluidic feature and at least an alignment feature at a distance from the at least a microfluidic feature for positioning and attaching a sensor device.

Aspects of the present disclosure allow for flow at least a fluid within the microfluidic device. This is so, at least in part, because the apparatus comprises at least a flow component, wherein the at least a flow component may include a passive flow component or an active flow component. In some embodiments, the at least a flow component may be configured to mix a plurality of fluid during the flow process.

Aspects of the present disclosure can be used to detect at least a sensed property of the at least a fluid within the apparatus. Aspects of the present disclosure can also be used to transfer the at least a sensed property to an external device. Exemplary embodiments illustrating aspects of the present disclosure are described below in the context of several specific examples.

Figure 1:
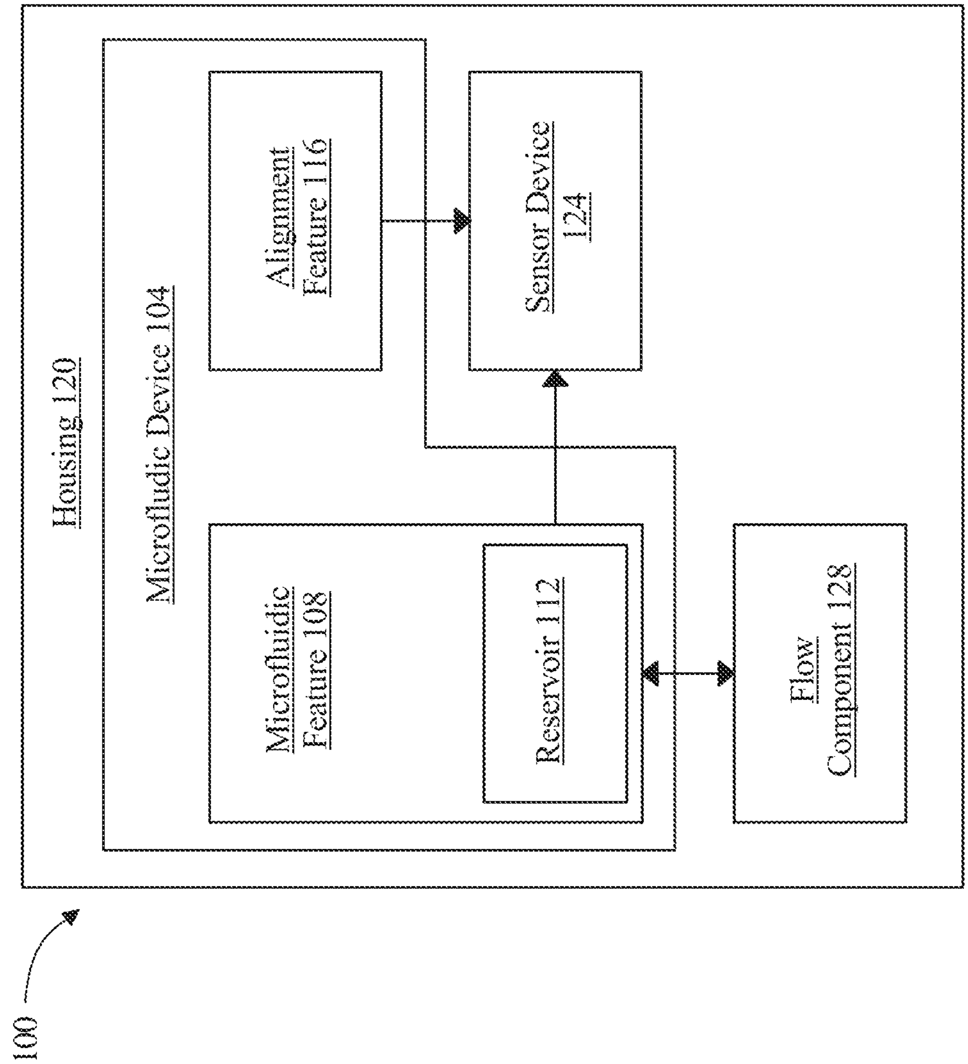
FIG. 1 is an exemplary embodiment of an apparatus for performing microfluidic-based biochemical assay.

Referring now to FIG. 1, an exemplary embodiment of an apparatus 100 for performing microfluidic-based biochemical assays is illustrated. As used in this disclosure, a "microfluidic-based biochemical assay" is an assay on small volumes (i.e., in unit of ml or nl) of fluids. In some embodiments, microfluidic-based biochemical assay may be used for a wide range of applications, such as without limitation, medical diagnostics, drug discovery, environmental monitoring, and food safety testing, and the like. Apparatus 100 may include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of apparatus 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a microfluidic device 104. As used in this disclosure, a "microfluidic device" is a device that is configured to act upon fluids at a small scale, such as without limitation a sub-millimeter scale. At small scales, surface forces may dominate volumetric forces. In a non-limiting example, microfluidic device may be consistent with any microfluidic device described in U.S. patent application Ser. No. 17/859,932, filed on Jul. 7, 2022, entitled "SYSTEM AND METHODS FOR FLUID SENSING USING PASSIVE FLOW," the entirety of which is incorporated herein by reference.

With continued reference to FIG. 1, microfluidic device 104 includes at least a microfluidic feature 108. As used in this disclosure, a "microfluidic feature" is a structure within microfluidic device 104 that is designed and/or configured to manipulate one or more fluids at micro scale. In a non-limiting example, microfluidic feature 108 may include, without limitation, reservoir, microfluidic channel, conjugate pad, and the like as described in further detail below in this disclosure. In some cases, microfluidic feature 108 may enable a precise manipulation of fluids and samples in a controlled and/or reproducible manner within microfluidic device 104. In some embodiments, microfluidic feature 108 of microfluidic device 104 may be designed and arranged based on particular needs of a given microfluidic-based biochemical assay. In other embodiments, microfluidic feature 108 of microfluidic device 104 may be varied depending on the type of the at least a fluid being used, that is directly contact with microfluidic feature 108. In a non-limiting example, attributes of microfluidic feature 108 such as, without the size and/or shape of the substrate may be determined as a function of specific assay protocols. Exemplary embodiments of microfluidic feature 108 are described in further detail below in this disclosure.

With continued reference to FIG. 1, microfluidic feature 108 includes at least a reservoir 112. Reservoir 112 may be configured to contain at least a fluid. In a non-limiting example, fluid may include a sample fluid to be analyzed from a subject; for instance, and without limitation, reservoir 112 of microfluidic device 104 may contain a blood sample taken from a patient. Alternatively, or additionally, fluid may include one or more suspensions and/or solutions of reagents, molecules, or other items to be analyzed and/or utilized, including without limitation monomers such as individual nucleotides, amino acids, or the like, one or more buffer solutions and/or saline solutions for rinsing steps, and/or one or more analytes to be detected and/or analyzed. Fluid and/or microfluidic device may be used, without limitation, in processes as disclosed in U.S. Nonprovisional application Ser. No. 17/337,931, filed on Jun. 3, 2021 and entitled "METHODS AND SYSTEMS FOR MONOMER CHAIN FORMATION," and/or as disclosed in U.S. Nonprovisional application Ser. No. 17/403,480, filed on Aug. 16, 2021 and entitled "TAGGED-BASE DNA SEQUENCING READOUT ON WAVEGUIDE SURFACES," the entirety of each of which is incorporated herein by reference. Reservoir 112 may have at least an inlet, at least an outlet, or both. Reservoir 112 may further include, without limitation, a well, a channel, a flow path, a flow cell, a pump, and the like. In a non-limiting example, fluid may be input through the at least an inlet into reservoir 112 and/or output through the at least an outlet. At least an outlet may be connected to other components and/or devices within microfluidic device 104; for instance, and without limitation, at least an outlet may be connected to other microfluidic feature 108 such as microfluidic channel as described below in this disclosure.

With continued reference to FIG. 1, microfluidic device 104 includes at least an alignment feature 116 at a distance from at least a microfluidic feature 108. In a microfluidic device used for performing biochemical assays, an "alignment feature" is a physical feature that helps to precisely align components of microfluidic device 104 with other components. Alignment feature 116 is configured for precise positioning and attaching a sensor device, wherein the sensor device may include any sensor device as described in this disclosure. In some embodiments, alignment feature 116 may be configured for precise positioning and attaching other components external to apparatus 100; for instance, and without limitation, without limitation, an external device may be coupled with apparatus 100 through one or more alignment features 116, such as, without limitation, a multi-fiber push connector (MPO), bracket, press fastener (with spring mechanism) or the like as described in further detail below. In some embodiments, alignment feature 116 may be configured for precise positioning microfluidic feature 108; for instance, and without limitation, microfluidic channel may be etched along alignment feature 116 during etching process as described below. In some cases, microfluidic channel may be configured to be in parallel to alignment feature 116 at a distance. In other cases, microfluidic channel may be configured to be perpendicular to alignment feature 116 at a distance. Other embodiments of microfluidic feature 108 alignment employing alignment feature 116 as reference may include, without limitation, symmetrical alignment, relative positioning, fix positioning, and the like thereof.

With continued reference to FIG. 1, in some embodiments, alignment feature 116 may include a housing 120. As used in this disclosure, a "housing" refers to an outer structure configured to contain a plurality of components, such as, without limitation, components of apparatus 100 as described in this disclosure. In a non-limiting example, alignment feature 116 may include an outer casing of apparatus 100. In some cases, housing 120 may be made from a durable, lightweight material such as without limitation, plastic, metal, and/or the like. In some embodiments, housing 120 may be designed and configured to protect sensitive components of apparatus 100 from damage or contamination. In a non-limiting example, at least an alignment feature 116 may include one or more flat facets located on housing 120 configured to constraint at least a sensor device as described above in this disclosure, wherein the "flat facet" refers to a surface or object that is smooth and event, without any significant curvature or bumps. In another non-limiting example, at least an alignment feature 116 may include one or more physical notches and/or grooves that allow for precise placement of devices and/or components. In yet another non-limiting example, at least an alignment feature 116 may include one or more optical markers or alignment indicators that are visible (through human eye, microscope, any other imaging system, and/or the like) and allow for accurate positioning of devices and/or components. In a further non-limiting examples, at least an alignment feature 116 may include one or more tapered or angled surfaces (of housing 120) that guide the one or more microfluidic features 108 through apparatus 100. In other non-limiting example, housing 120 may include one or more surface coatings and/or modifications that reduce the likelihood of unwanted adhesion or interference with external components such as, without limitation, external device as described in further detail below. Additionally, or alternatively, at least an alignment feature 116 may further include features such as latches, clips, or other fasteners that help to secure apparatus 100 in place during use.

Still referring to FIG. 1, in some embodiments, at least an alignment feature 116 may include a sealer. As used in this disclosure, a "sealer" is a component that is used to create a secure seal between components of apparatus 100. In some cases, sealer may be configured to prevent contamination (i.e., dust, debris, other external factors, and/or the like) of the fluids, thus ensuring accurate, reliable results. In a non-limiting example, sealer of at least an alignment feature 116 May be configured to seal between one or more microfluidic features 108 within microfluidic device 104 and housing 120. In some embodiments, sealers can take many forms, depending on the overall design and/or configuration of apparatus 100; for instance, and without limitation, sealer may include O-rings, gaskets, adhesives, or other materials that are used to fill gaps and/or create a fluid-tight seal between microfluidic channel and housing 120. In some embodiments, sealer may be applied to the surface of microfluidic device 104 to create a barrier between microfluidic feature 108 with external environment. In some cases, sealer may be heat-sealable. In a non-limiting example, sealer may include a heat-sealable film or tape, made from a flexible, thermoplastic material that can be heated and molded to the contours of the apparatus 100, creating a barrier between the microfluidic device 104 and the external environment.

With continued reference to FIG. 1, apparatus 100 includes a sensor device 124. Sensor device 124 may be configured to be in sensed communication with at least a fluid contained within or otherwise acted upon by microfluidic feature 108. As used in this disclosure, a "sensor device" is one or more independent sensors, as described herein, where any number of the described sensors may be used to detect any number of physical quantities associated with an microfluidic environment . . . . In some embodiments, sensor device 124 may include an optical device. As used in this disclosure, an “optical device” is any device that generates, transmits, detects, or otherwise functions using electromagnetic radiation, including without limitation ultra-violet light, visible light, near infrared light, infrared light, and the like. In some embodiments, optical device may include one or more waveguide. As used in this disclosure, a “waveguide” is a component that is configured to propagate electromagnetic radiation, including without limitation ultra-violet light, visible light, near infrared light, infrared light, and the like. A waveguide may include a lightguide, a fiberoptic, or the like. A waveguide may include a grating within a transmissive material. In some cases, a waveguide may be configured to function as one or more optical devices, for example a resonator (e.g., microring resonator), an interferometer, or the like. In some cases, waveguide may be configured to propagate an electromagnetic radiation (EMR). In a non-limiting example, sensor device 124 may include any sensor device described in U.S. patent application Ser. No. 17/859,932 and/or any other disclosure incorporate by reference herein. Sensor device 124 may include a sensor, wherein the sensor may be optical communication with one or more waveguide. Such sensor may be configured to detect a variance in at least an optical property associated with the at least a fluid. As used in this disclosure, an “optical property” is any detectable characteristic associated with electromagnetic radiation, for instance UV, visible light, infrared, and the like. In some cases, sensor device may generate and/or communicate signal representative of the detected property.

Still referring to FIG. 1, in some embodiments, sensor may be in communication with the computing device. For instance, and without limitation, sensor 128 may communicate with computing device using one or more signals. As used in this disclosure, a “signal” is a human-intelligible and/or machine-readable representation of data, for example and without limitation an electrical and/or digital signal from one device to another; signals may be passed using any suitable communicative connection. As used in this disclosure, “communicatively connected” means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology “communicatively coupled” may be used in place of communicatively connected in this disclosure. A signal may include an optical signal, a hydraulic signal, a pneumatic signal, a mechanical signal, an electric signal, a digital signal, an analog signal, and the like. In some cases, a signal may be used to communicate with a computing device, for example by way of one or more ports. In some cases, a signal may be transmitted and/or received by computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus 100, sensor, and/or computing device may perform one or more signal processing steps on a signal. For instance, apparatus 100, sensor, and/or computing device may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, phase-locked loops, and/or any other process using operational amplifiers or other analog circuit elements. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, in some embodiments, apparatus 100 may include one or more light sources. As used in this disclosure, a "light source" is any device configured to emit electromagnetic radiation, such as without limitation light, UV, visible light, and/or infrared light. In some cases, a light source may include a coherent light source, which is configured to emit coherent light, for example a laser. In some cases, a light source may include a non-coherent light source configured to emit non-coherent light, for example a light emitting diode (LED). In some cases, light source may emit a light having substantially one wavelength. In some cases, light source may emit a light having a wavelength range. Light may have a wavelength in an ultraviolet range, a visible range, a near-infrared range, a mid-infrared range, and/or a far-infrared range. For example, in some cases light may have a wavelength within a range from about 100 nm to about 20 micrometers. In some cases, light may have a wavelength within a range of about 400 nm to about 2,500 nm. Light sources may include, one or more diode lasers, which may be fabricated, without limitation, as an element of an integrated circuit; diode lasers may include, without limitation, a Fabry Perot cavity laser, which may have multiple modes permitting outputting light of multiple wavelengths, a quantum dot and/or quantum well-based Fabry Perot cavity laser, an external cavity laser, a mode-locked laser such as a gain-absorber system, configured to output light of multiple wavelengths, a distributed feedback (DFB) laser, a distributed Bragg reflector (DBR) laser, an optical frequency comb, and/or a vertical cavity surface emitting laser. Light source may additionally or alternatively include a light-emitting diode (LED), an organic LED (OLED) and/or any other light emitter. In some cases, light source may be configured to couple light into optical device, for instance into one or more waveguide described above.

With continued reference to FIG. 1, in some embodiments, at least a sensor device 124 may include at least a photodetector. In some cases, at least a sensor device 124 may include a plurality of photodetectors, for instance at least a first photodetector and at least a second photodetector. In some cases, at least a first photodetector and/or at least a second photodetector may be configured to measure one or more of first optical output and second optical output, from a first waveguide and a second waveguide, respectively. As used in this disclosure, a "photodetector" is any device that is sensitive to light and thereby able to detect light. In some cases, a photodetector may include a photodiode, a photoresistor, a photosensor, a photovoltaic chip, and the like. In some cases, photodetector may include a Germanium-based photodiode. Light detectors may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. Avalanche Photo Diodes (APDs), as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs provide a built-in stage of gain through avalanche multiplication. When the reverse bias is less than the breakdown voltage, the gain of the APD is approximately linear. For silicon APDs this gain is on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. At least a first photodetector may be configured to generate a first signal as a function of variance of an optical property of the first waveguide, where the first signal may include without limitation any voltage and/or current waveform. Additionally, or alternatively, sensor device may include a second photodetector located down beam from a second waveguide. In some embodiments, second photodetector may be configured to measure a variance of an optical property of second waveguide and generate a second signal as a function of the variance of the optical property of the second waveguide.

With continued reference to FIG. 1, in some cases, photodetector may include a photosensor array, for example without limitation a one-dimensional array. Photosensor array may be configured to detect a variance in an optical property of waveguide. In some cases, first photodetector and/or second photodetector may be wavelength dependent. For instance, and without limitation, first photodetector and/or second photodetector may have a narrow range of wavelengths to which each of first photodetector and second photodetector are sensitive. As a further non-limiting example, each of first photodetector and second photodetector may be preceded by wavelength-specific optical filters such as bandpass filters and/or filter sets, or the like; in any case, a splitter may divide output from optical matrix multiplier as described below and provide it to each of first photodetector and second photodetector. Alternatively, or additionally, one or more optical elements may divide output from waveguide prior to provision to each of first photodetector and second photodetector, such that each of first photodetector and second photodetector receives a distinct wavelength and/or set of wavelengths. For example, and without limitation, in some cases a wavelength demultiplexer may be disposed between waveguides and first photodetector and/or second photodetector; and the wavelength demultiplexer may be configured to separate one or more lights or light arrays dependent upon wavelength. As used in this disclosure, a "wavelength demultiplexer" is a device that is configured to separate two or more wavelengths of light from a shared optical path. In some cases, a wavelength demultiplexer may include at least a dichroic beam splitter. In some cases, a wavelength demultiplexer may include any of a hot mirror, a cold mirror, a short-pass filter, a long pass filter, a notch filter, and the like. An exemplary wavelength demultiplexer may include part No. WDM-11P from OZ Optics of Ottawa, Ontario, Canada. Further examples of demultiplexers may include, without limitation, gratings, prisms, and/or any other devices and/or components for separating light by wavelengths that may occur to persons skilled in the art upon reviewing the entirety of this disclosure. In some cases, at least a photodetector may be communicative with computing device, such that a sensed signal may be communicated with computing device.

With continued reference to FIG. 1, in some embodiments, microfluidic feature 108 may include a sensor interface. Sensor interface may be configured to wet waveguide with at least a fluid contained within or otherwise acted upon by microfluidic device 104. As used in this disclosure, a "sensor interface" is an arrangement permits sensor device 124 to be in sensed communication with microfluidic device 104. In some embodiments, sensor interface may include an optical interface. As used in this disclosure, an "optical interface" is an arrangement permits optical device to be in sensed communication with microfluidic device 104. In one embodiment, sensor device may be coupled to a sensor interface that includes a porous membrane (e.g., nitrocellulose, paper, glass fiber, etc.) as described below that promotes capillary flow. In some cases, a surface of sensor device may be modified with hydrophilic chemistry, for instance by way of silanes, proteins, or another treatment (or may already be hydrophilic) in the sensing region. For example, one or more of sensor devices and sensor interfaces may be configured such that liquid wicks from a porous membrane to a surface of sensor device as it flows through the membrane.

Still referring to FIG. 1, in some embodiments, sensor interface of microfluidic feature 108 may include a flow cell. As used in this disclosure, a "flow cell" is a component of or associated with a microfluidic device that contains and provides access to a fluid or a flow of a fluid for a sensor interface arrangement. In some cases, a flow cell may effectively increase an area over which at least a fluid flows, thereby increasing access to the at least a fluid for optical sensing. In some cases, a flow cell may include micro-posts. In some cases, a flow cell may include a plurality of micro-posts. As used in this disclosure, "micro-posts" are small scale (e.g., sub-millimeter) protrusions which break up a flow path. In some cases, a micro-post property may be varied in order to affect a flow property. Exemplary non-limiting micro-post properties include pitch, micro-post width (e.g., diameter), micro-post arrangement (e.g., hexagonal), micro-post size (e.g., column), micro-post height, number of micro-posts (total, in a row, in a column, etc.), and the like.

Still referring to FIG. 1, in some embodiments, sensor interface of microfluidic feature 108 may include a porous membrane. As used in this disclosure, a "porous membrane" is a material with a plurality of voids. In some cases, a porous membrane may have at least a membrane property selected to achieve at least a flow property. As used in this disclosure, a "membrane property" is an objective characteristic associated with a porous membrane. Exemplary non-limiting membrane properties include pore size, porosity, measures of hydrophilicity, measures of surface tension, measures of capillary action, material, and the like. In some embodiments, a porous membrane interfacing with at least a sensor device 124 and microfluidic device 104 and/or microfluidic feature 108 may provide several advantages. In a non-limiting example, a porous membrane connecting two segments of a channel may provide fluidic communication, connecting one segment of the channel to another; (the porous membrane may, thus, carry reagents and/or samples in solution, and open the channel to an outside environment while maintaining fluidic flow to the microfluidic device 104 and/or microfluidic feature 108). In another non-limiting example, a porous membrane may eliminate need for a gasket (which may leak and result in poor yield). In a further non-limiting example, a porous membrane may help control one or more flow properties. As used in this disclosure, "flow properties" are characteristics related to a flow of a fluid as described in further detail below in this disclosure. For instance, exemplary non-limiting flow properties include flow rate (in μl/min), flow velocity, integrated flow volume, pressure, differential pressure, and the like. For instance, and without limitation, flow rate within microfluidic feature 108 may be determined by pore size, pore density, membrane material, and porous membrane dimensions. In other non-limiting examples, a porous membrane strip interfacing at least a sensor device 124 to microfluidic device 104 and/or microfluidic feature 108 may require less precision.

With continued reference to FIG. 1, in some embodiments, microfluidic feature 108 may include at least a channel. As used in this disclosure, a "channel" is a reservoir having one or more of an inlet (i.e., input) and an outlet (i.e., output). Channels may have a sub millimeter scale consistent with microfluidics. Channels may have channel properties which affect other system properties (e.g., flow properties, flow timing, and the like). As used in this disclosure, "flow timing" is any time-dependent property associated with a flow of at least a fluid. For instance, in some cases, flow timing may include a duration for a flow to reach, pass through, or otherwise interact with an element of microfluidic device 104 and/or other microfluidic features; for instance, and without limitation, flow out from reservoir 112. As used in this disclosure, "channel properties" are objective characteristics associated with channels or a microfluidic device generally. Exemplary non-limiting channel properties include width, height, length, material, surface roughness, cross-sectional area, layout, and the like. Additionally, or alternatively, microfluidic feature 108 may include a microfluidic circuit. As used in this disclosure, a "microfluidic circuit" is a configuration of a plurality of microscale fluidic components within microfluidic device 104. Microscale fluidic components may include any microfluidic feature 108 of microfluidic device 104 as described above. In a non-limiting example, microfluidic circuit may include a configuration of channels, individually addressable valves, and chambers through which fluid is allowed to flow. Microfluidic circuit disclosed here may be consistent with any microfluidic circuit described in U.S. patent application Ser. No. 18/107,135, filed on Feb. 8, 2023, entitled "APPARATUS AND METHODS FOR ACTUATING FLUIDS IN A BIOSENSOR CARTRIDGE," the entirety of which is incorporated herein by reference.

With continued reference to FIG. 1, microfluidic device 104 with integrated sensor device 124 may be utilized in an advanced diagnostic device or diagnostic sensor for detection of biological signatures (e.g., viruses, bacteria, pathogens, and the like). In some cases, microfluidic feature 108 may be fabricated on a substrate. Substrate may be composed of various materials, such as glass, silicon, and the like. In one or more embodiments, microfluidic device 104 containing microfluidic features may be fabricated using various processes, such as, for example, photolithography, injection molding, stamping processes, and the like. In various embodiments, substrate may be substantially planar. In some embodiments, microfluidic feature 108 may be built on a substrate using, for example, photosensitive polymers or photoresists (e.g., SU-8, Ostemer, and the like). In other embodiments, microfluidic feature 108 may be molded or stamped into polymers (e.g., PMMA). In other embodiments, components and/or devices of microfluidic device 104 may be built into or on substrate using etching processes, in which channels, reservoir 112, capillary pumps, and valves may be built by removing materials from substrate. In non-limiting embodiments, the entire microfluidic system may be fabricated on substrate, sealed with a cover plate, where holes are drilled and aligned with certain microfluidic components, such as reservoir 112. Additionally, or alternatively, substrate may then be diced into small chips. Chips may also be fabricated with microfluidic features etch or patterned on them. Further, they can be coupled to microfluidic features fabricated separately on another substrate such as plastic or glass.

With continued reference to FIG. 1, apparatus 100 further includes at least a flow component 128 connected with at least a microfluidic feature 108 configured to flow at least a fluid through at least a sensor device 124. In some embodiments, at least a flow component 128 may include a passive flow component configured to initiate a passive flow process. As used in this disclosure, a "passive flow component" is a component, typically of a microfluidic device, that imparts a passive flow on a fluid, wherein the "passive flow," for the purpose of this disclosure, is flow of fluid, which is induced absent any external actuators, fields, or power sources. As used in this disclosure, a "passive flow process" is a plurality of actions or steps taken on passive flow component in order to impart a passive flow on at least a fluid. Passive flow component may employ one or more passive flow techniques in order to initiate passive flow process; for instance, and without limitation, passive flow techniques may include osmosis, capillary action, surface tension, pressure, gravity-driven flow, hydrostatic flow, vacuums, and the like. Passive flow component may be in fluidic communication with at least a reservoir 112. Exemplary non-limiting passive flow component is explained in greater detail in this disclosure below. Passive flow component may be configured to flow at least a fluid stored in at least a reservoir 112 with predetermined flow properties. In a non-limiting example, passive flow component may be consistent with any passive flow component described in U.S. patent application Ser. No. 17/859,932, filed on Jul. 7, 2022, entitled "SYSTEM AND METHODS FOR FLUID SENSING USING PASSIVE FLOW," the entirety of which is incorporated herein by reference.

With continued reference to FIG. 1, in other embodiments, at least a flow component 128 may include an active flow component configured to initiate an active flow process. As used in this disclosure, an "active flow component" is a component that imparts an active flow on a fluid, wherein the "active flow," for the purpose of this disclosure, is flow of fluid which is induced by external actuators, fields, or power sources. As used in this disclosure, an "active flow process" is a plurality of actions or steps taken on active flow component in order to impart active flow on at least a fluid. In some embodiments, active flow component 116 is in fluidic communication with at least a reservoir 112. In a non-limiting example, active flow component may include one or more pumps. Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir 112. In some cases, reservoir 112 may be unpressurized and/or vented. Alternatively, reservoir 112 may be pressurized and/or sealed; for instance, by alignment component 116 such as, without limitation, sealer as described above. In a non-limiting example, active flow component may include any active flow component as described in U.S. patent application Ser. No. 18/107,135. Exemplary non-limiting active flow component is explained in greater detail in this disclosure below in reference to FIGS. 10A-B.

With continued reference to FIG. 1, in some embodiments, active flow component may be powered by a power source. As used in this disclosure, With continued reference to FIG. 1, in some cases, development of microfluid feature layout, selection of flow component, and sensor interface may need to be performed in an iterative design process as each parameter is interdependent with important system properties (e.g., flow properties and flow timing). In some embodiments, aspect ratios of chambers (e.g., reservoir 112), fluidic resistances (controlled by dimensions) of channels between the chambers (and sensor interface), and flow component parameters (e.g., pump pressure) may be tuned to affect one or both of timing and flow of at least a fluid. In some embodiments, microfluidic feature 108 within microfluidic device 104 of apparatus 100 may be hydrophilic, for example through coating, to ensure flow. Alternatively, or additionally, microfluidic device 104 may include a hydrophilic material, such as without limitation polymethyl methacrylate (PPMA). Further, a reagent chamber may be placed such that the sensor reaction chamber is between the reagent chamber and the sample chamber.

Figure 2A:
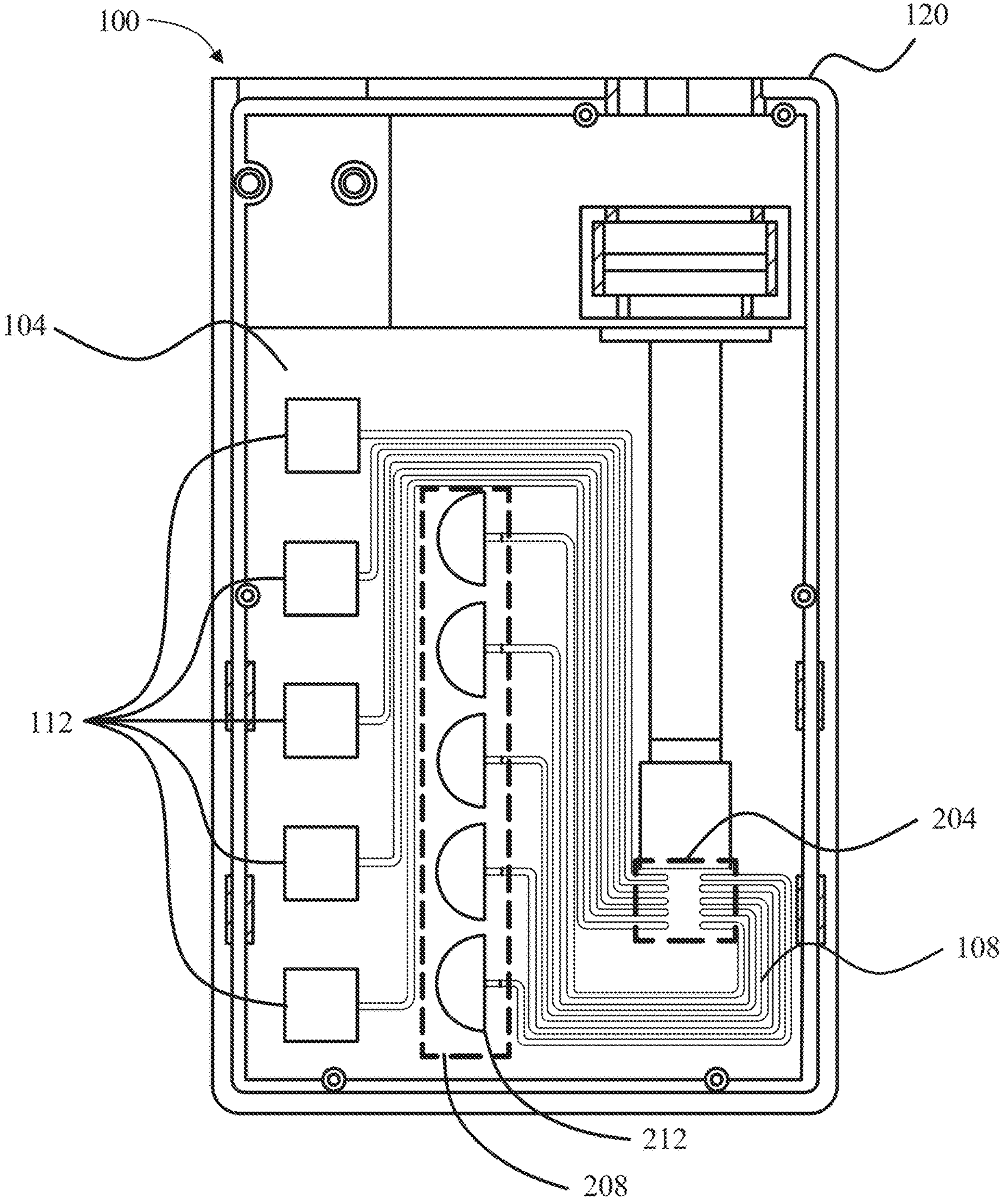
FIGS. 2A-C are exemplary embodiments of sensor device integrated to different microfluidic environments.
Figure 2B:
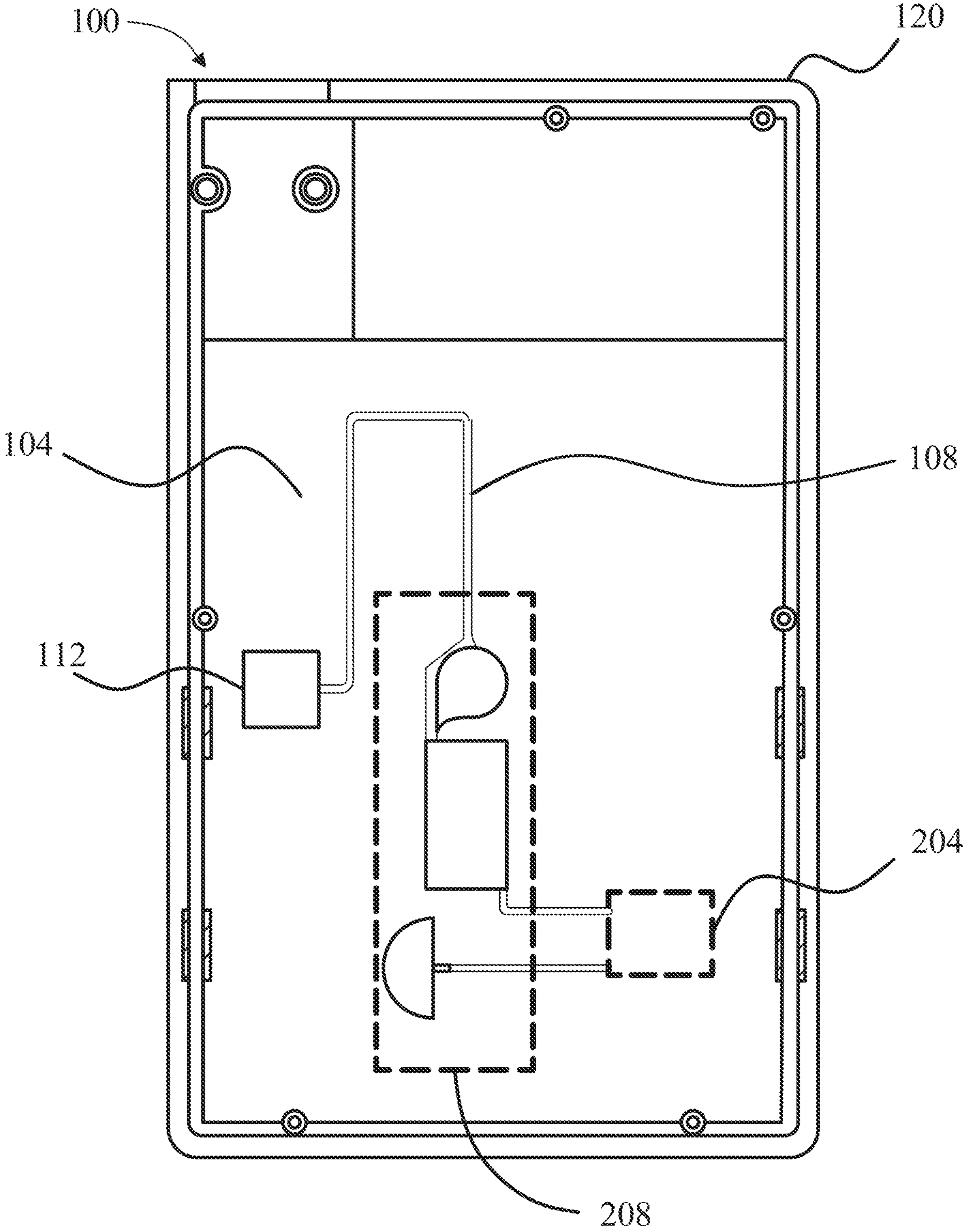
Figure 2C:
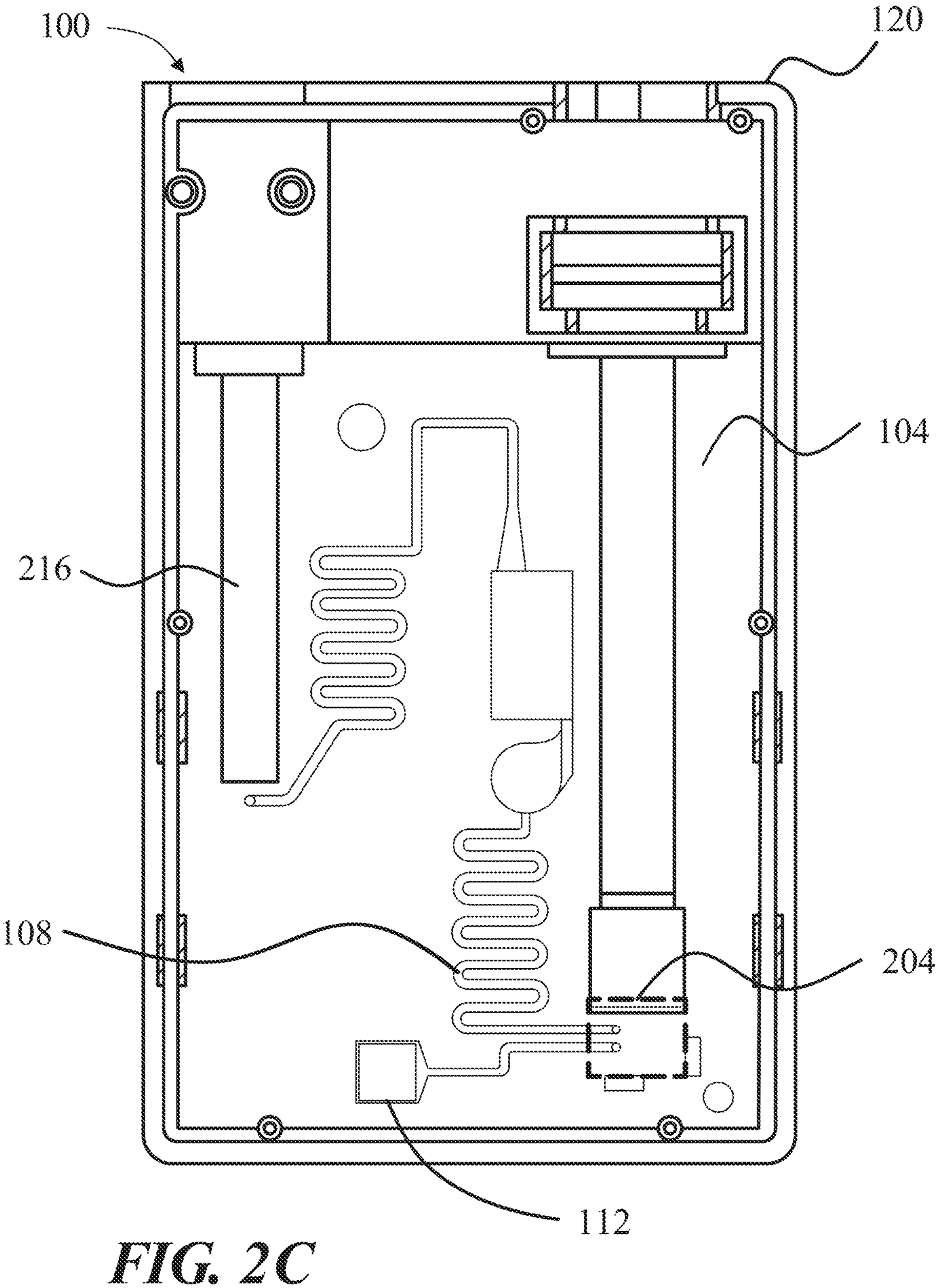

Now referring to FIGS. 2A-C, exemplary embodiments of at least a sensor device 124 integrated to different microfluidic environments are illustrated. At least a sensor device 124 may be disposed in a sensor area 204. As used in this disclosure, a "sensor area" is a position, a location, or otherwise an area determined by at least an alignment feature 116 as described above. In some embodiments, sensor area may match with at least a surface of sensor device 124; for instance, and without limitation, alignment feature 116 may include a slightly depressed plane, wherein the slightly depressed plane may include a same surface area with the at least a surface of sensor device 124. In some embodiments, microfluidic feature 108 may be configured to pass through sensor area 204. In some cases, microfluidic feature 108 such as microfluidic channels may pass underneath sensor area 204. In other cases, microfluidic feature 108 such as microfluidic channels may pass above sensor area 204. In a non-limiting example, sensor area 204 may be located at a first layer, wherein the first layer may be above or below a second layer containing the microfluidic environment. At least an alignment feature 116, such as, without limitation, a sealer, may be placed between the first layer and the second layer; however, the sealer may avoid at least a portion of sensor area 204 in order for sensor device 124 disposed at sensor area 204 to detect sensed properties as described above, such as, without limitation, optical properties (e.g., wavelength, frequency, intensity, polarization, spectral distribution, absorption and emission spectra, and the like) and flow properties (e.g., flow rate, flow velocity, integrated flow volume, pressure, and the like). As used in this disclosure, a "microfluidic environment" refers to a complex system of plurality of microfluidic features such as, without limitation, microfluidic channels, chambers, valves, other components within microfluidic devices 104 that are used to transport and/or manipulate at least a fluid on a microscale within apparatus 100.

Still referring to FIGS. 2A-C, exemplary embodiments of at least a sensor device 124 integrated to a passive microfluidic environment is illustrated. In some embodiments, microfluidic environment may include a passive microfluidic environment, wherein the passive microfluidic environment is a microfluidic environment driven by passive flow component 208. Passive flow component 208 may include any passive flow component as described in this disclosure. In a non-limiting example, flow of at least a fluid within passive microfluidic environment may only include passive flow. Passive microfluidic environment may utilize capillary action or wicking, provided by passive flow component 208, to flow at least a fluid through microfluidic feature 108 of microfluidic device 104 as described above. In some embodiments, passive flow component 204 may include a capillary pump 212. As used in this disclosure, a "capillary pump" is a component that operates without any external power source and relies on capillary action to move at least a fluids in fluidic communication with the capillary pump 212. "Capillary action," for the purpose of this disclosure, is a phenomenon that occurs when a liquid such as, without limitation, at least a fluid, in contact with a solid surface such as, without limitation, sensor interface including porous membrane, and is able to move against gravity due to the combined effects of adhesive and cohesive forces. In a non-limiting example, passive flow process may be initiated as a function of such capillary action. In a non-limiting example, when the porous membrane is in contact with the at least a fluid in a first reservoir, the at least a fluid may be drawn into the pores of the porous membrane due to capillary action. First reservoir may be located at a first layer. A pressure difference may be created across the medium as the at least a fluid fills the pores; for instance, and without limitation, pressure may be higher on the side of the porous membrane that is in contact with the at least a fluid. Such pressure difference may cause the at least a fluid to flow through the sensor interface and into a second reservoir, wherein the second reservoir may be located at a second layer, and wherein the first layer is above the second layer, separated by sealer. In some cases, capillary pump 212 may operate continuously, as long as there is a sufficient supply of fluid in first reservoir. Flow properties such as, without limitation, the rate of flow of at least a fluid through capillary pump 212 may be determined by the size and porosity of the porous membrane, the surface tension of the at least a fluid, and the height difference between first reservoir and second reservoir. Additionally, or alternatively, passive microfluidic environment (as shown in FIG. 2B) may utilize other microfluidic feature such as, without limitation, a conjugate pad, and a bubble trap, wherein both component will be described in further detail below. Further, in other embodiments, microfluidic environment may include an active microfluidic environment (as shown in FIG. 2C), wherein the active microfluidic environment is a microfluidic environment driven by active flow component 216. Active flow component may include any active flow component as described in this disclosure. Elements of active flow component 216 are described in further detail below in this disclosure. In such embodiment, active microfluidic environment may utilize a pressure, produced and/or varied by active flow component 216 powered by a power source, to flow at least a fluid through microfluidic feature 108 of microfluidic device 104.

Figure 3A:
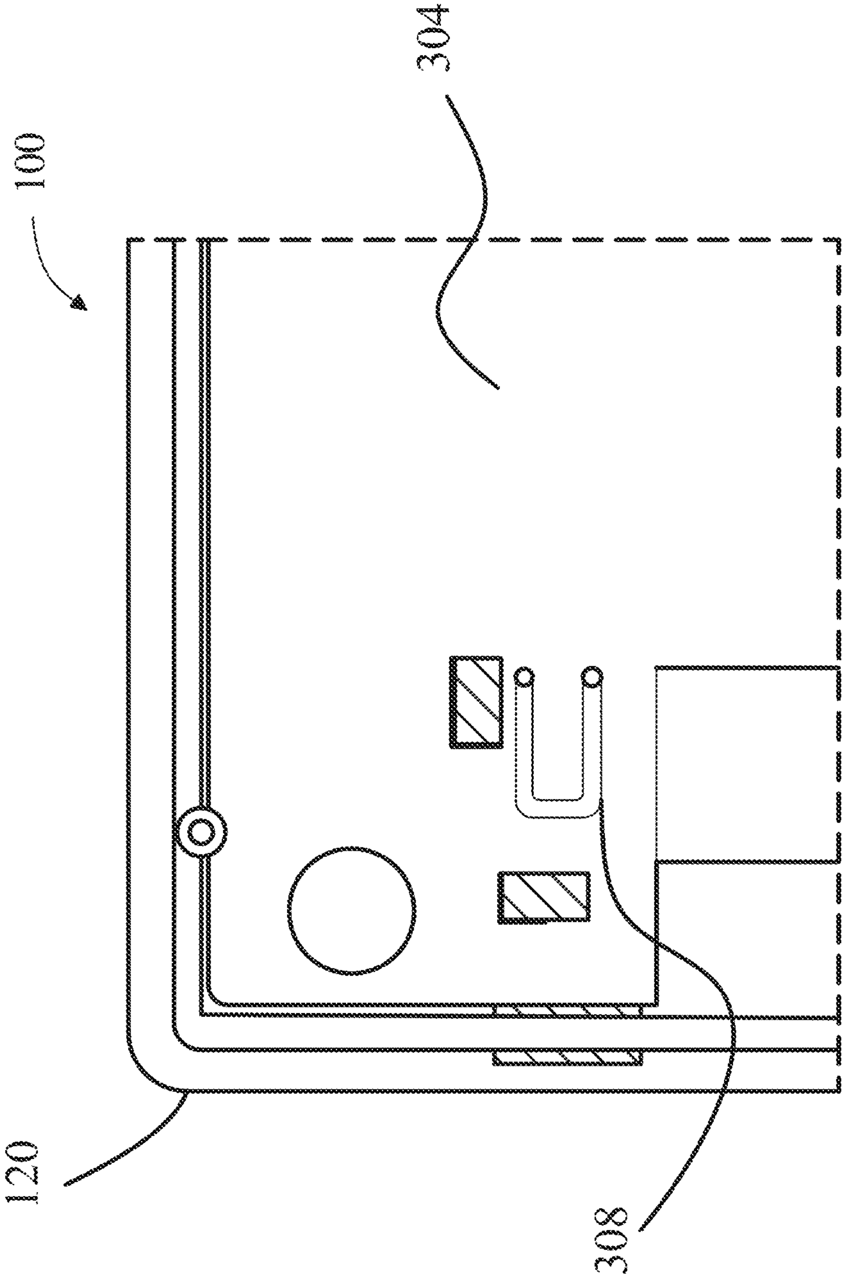
FIGS. 3A-C are exemplary embodiments of using double-sided adhesive (DSA) to create a channel while sealing other microfluidic channels.
Figure 3B:
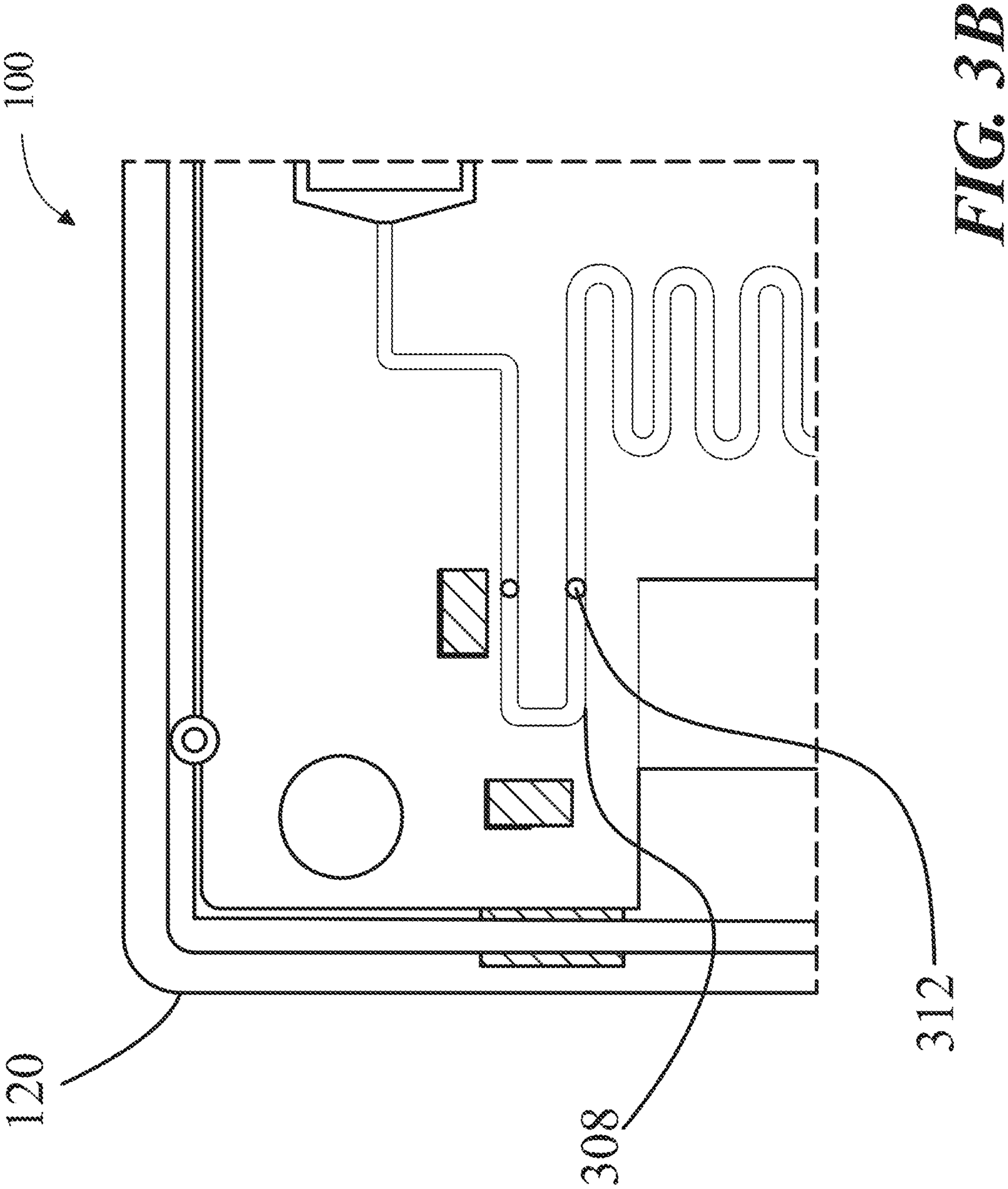
Figure 3C:
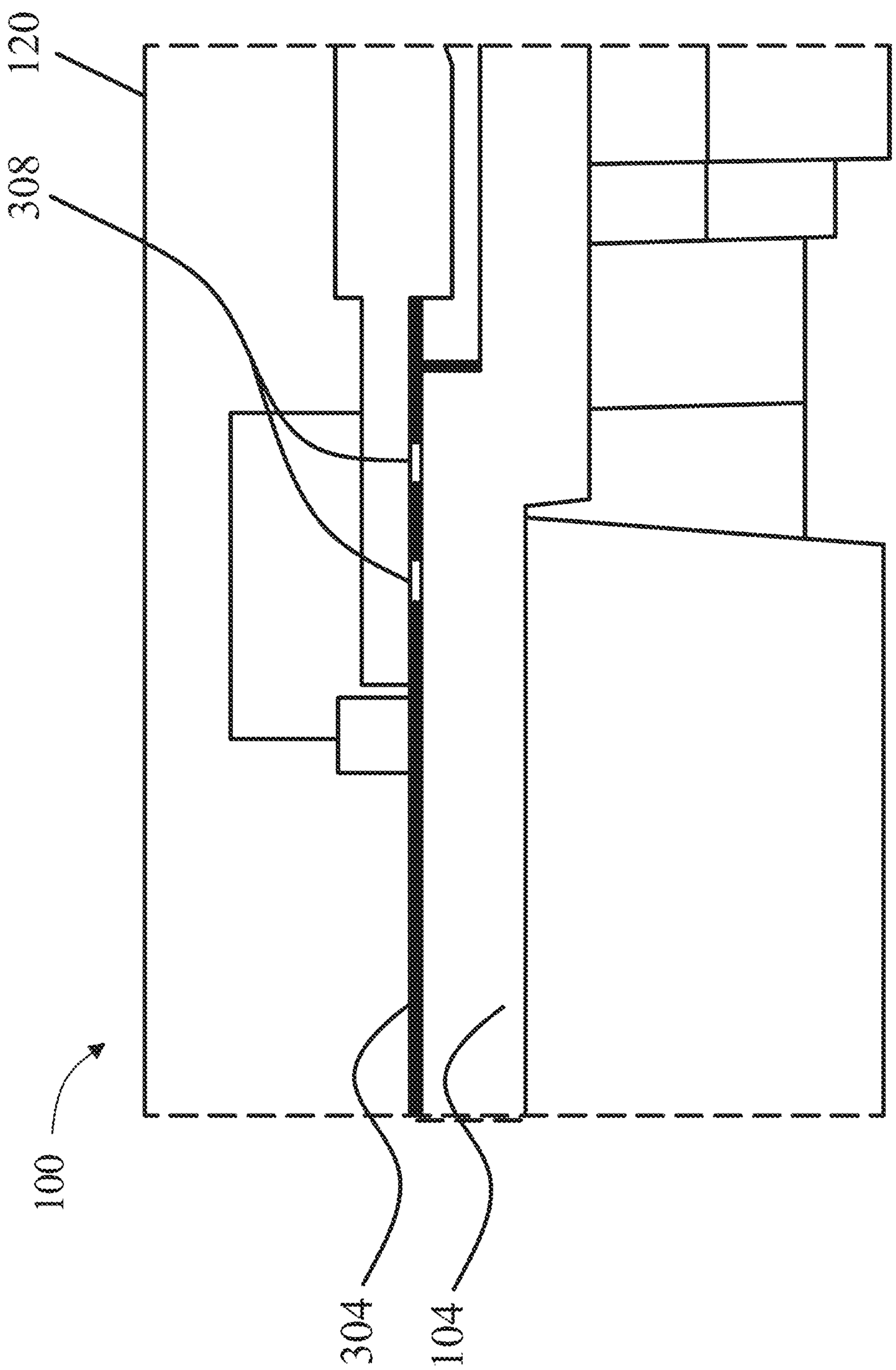

Now referring to FIGS. 3A-C, an exemplary embodiment of using double-sided adhesive (DSA) to create a channel while sealing other microfluidic channels is illustrated. In an embodiment, sensor device 124 may be exposed to microfluidic feature such as, without limitation, microfluidic channel, by means of a sealer 304 with an etched-through channel 308 (as shown in FIG. 3A). Sealer 304 may be applied to the surface of microfluidic device 104 within housing 120. In a non-limiting example, sealer 304 may include a double-sided adhesive (DSA). At least a portion of DSA may be removed through etching process; therefore, creating etched-through channel 308. Etched-through channel 308 may include any properties of microfluidic feature 108. Properties of microfluidic feature 108 are described in further detail below in reference to FIGS. 9A-B. In another embodiment, etched-through channel 308 on sealer 304 may interact with microfluidic feature 108 of microfluidic device 104 through one or more channel elevators 312 (as shown in FIG. 3B). Etched-through channel 308 may be configured to conduct flow of at least a fluid and avoids channeling outside desired path. As used in this disclosure, a "channel elevator" is a structure configured to connect at least two channels on different layers. In a non-limiting example, etched through channel 308 may be located at a first layer with sealer 304 and microfluidic feature 108 such as, without limitation, microfluidic channel may be located at a second layer with microfluidic device 104, wherein the first layer may be stacked above the second layer. In some cases, channel elevator 312 may include a vertical channel connecting etched-through channel 308 at first layer and microfluidic channel at second layer. In other cases, channel elevator 312 may include an uphill/downhill channel connecting etched-through channel 308 at first layer and microfluidic channel at second layer. In a further embodiment, sealer 304 may server as a spacer serving a function only of sealing. In a non-limiting example, a third layer may be disposed upon sealer 304 (as shown in FIG. 3C, a lateral view of a segment of apparatus 100); for instance, and without limitation, housing 120 may be attached to another side of the DSA.

Figure 4:
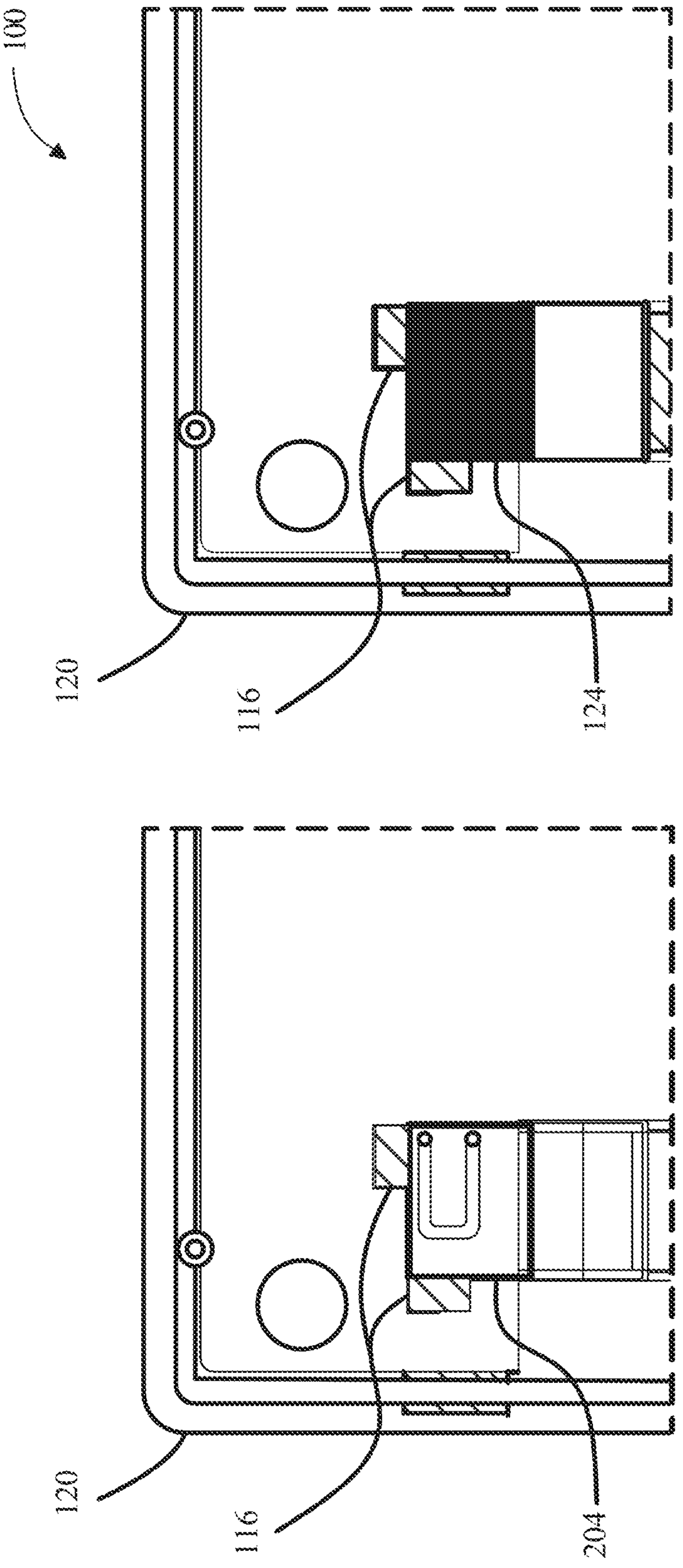
FIG. 4 is an exemplary embodiment of alignment features that allow placement of sensor device over microfluidic feature.

Now referring to FIGS. 4, an exemplary embodiment of alignment feature 116 that allow placement of the at least a sensor device 124 over at least a microfluidic feature 108 is illustrated. Alignment feature 116 may include any alignment feature described in this disclosure. In some cases, Alignment feature 116 may protrude so that sensor device 124 may contact the a flat surface and enable alignment. In a non-limiting example, alignment feature 116 may allow for precise manufacturing of a flat facet (i.e., sensor area 204) for the placement of sensor device 124. Sensor device 124 may be placed against microfluidic feature 108 such as, without limitation, microfluidic channel, or etched-through channel 308 on sealer 304 as described above. In an embodiment, alignment feature 116 may include a plurality of bulges configured to align and constrain sensor device 124 within sensor area 204. In a non-limiting example, alignment feature 116 may include a first bulge on a first side of sensor device 124 and a second bulge on a side neighboring the first side of sensor device 124. Such configuration may enable at least a corner of sensor device 124 to be located at a desired position on the surface of microfluidic device 104; therefore, allowing an active regions of the sensor to be positioned in specific regions.

Figure 5A:
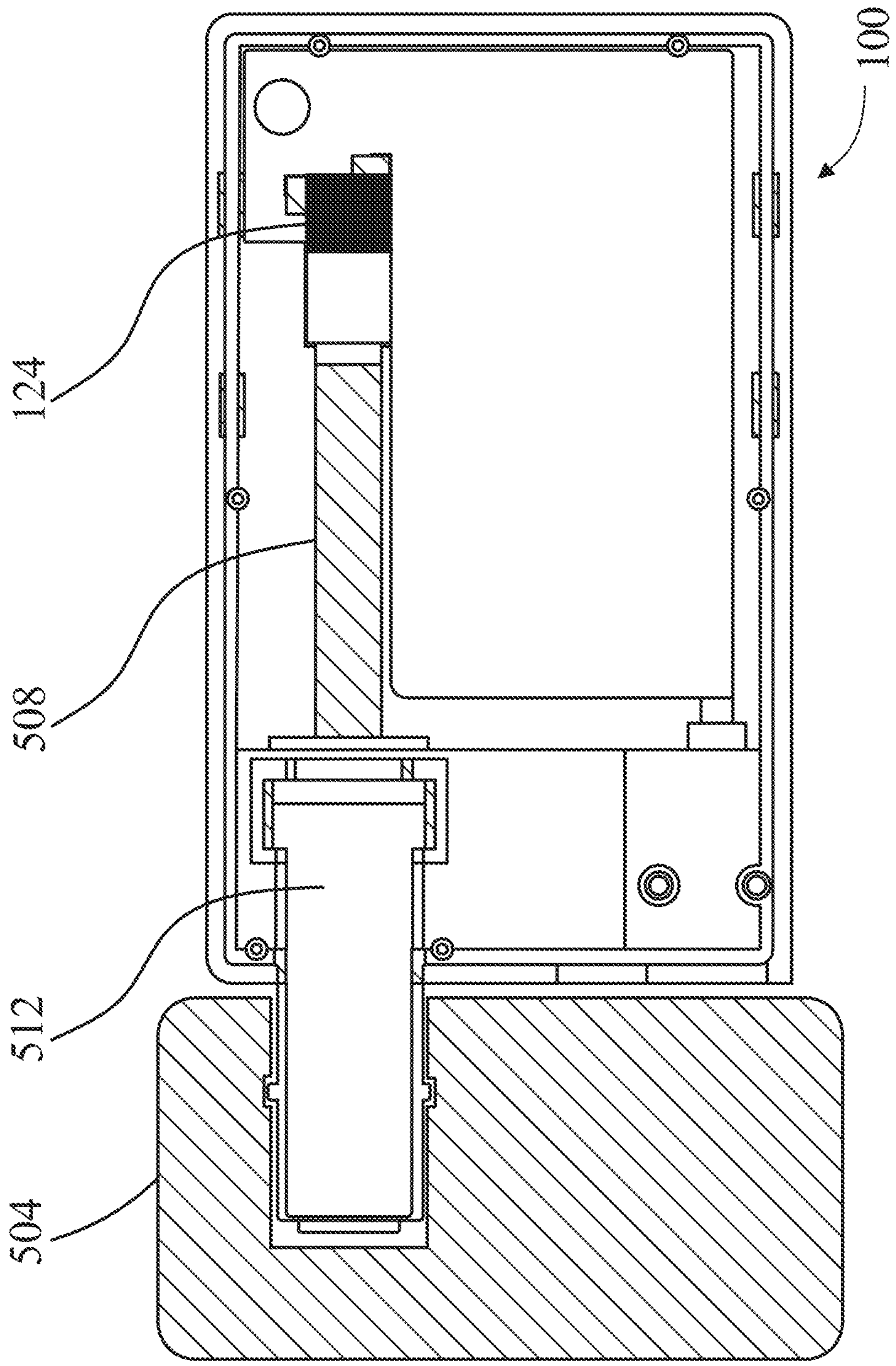
FIGS. 5A-B is an exemplary embodiments of possible data transfer from apparatus to external device.
Figure 5B:
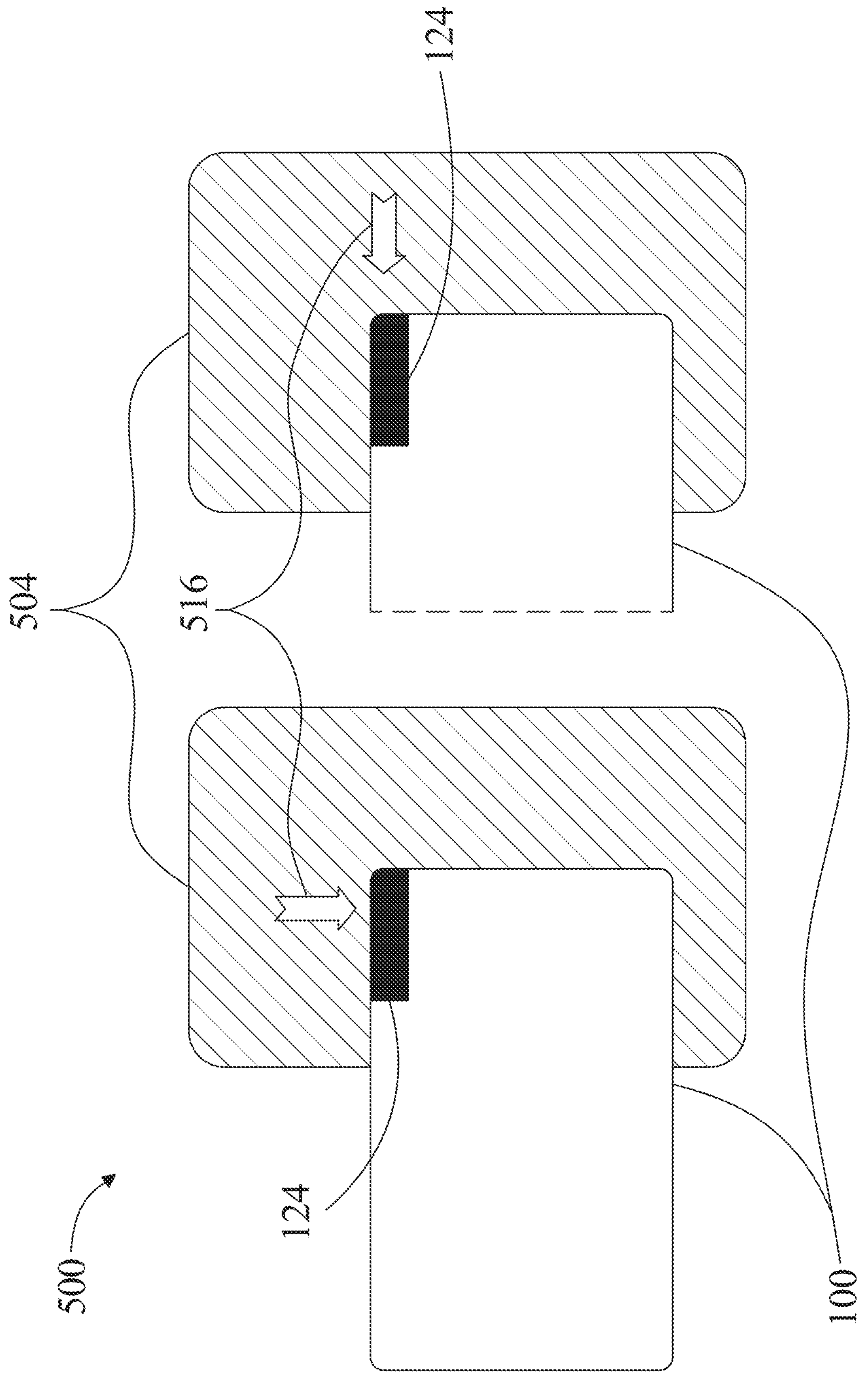

Now referring to FIGS. 5A-B, exemplary embodiments of possible data transfer from apparatus 100 to external device 504 are illustrated. As used in this disclosure, an "external device" generally refers to any device or component that is physically separate from apparatus 100 from the exterior. In some embodiments, external device may include any computing device as described in this disclosure. External device 504 may include a device such as, without limitation, a computing device as described in this disclosure, that is not an integral part of apparatus 100 but is instead connected or interfaced with apparatus 100 in some way to provide additional functionality or capabilities. In a non-limiting example, external device 504 may include an external reader configured read and/or process sensed properties from sensor device 124 as described above. External device 504 may be configured to read, interpret, or otherwise record (optical, electrical, and/or magnetic) signals generated and output by sensor device 124. In some embodiments, external device 504 may be used in conjunction with apparatus 100 for performing microfluidic-based biochemical assay. In a non-limiting example, sensor device 124 may transfer output data containing, without limitation, sensed properties to external device 504 using an optical fiber ribbon 508 and a multi-fiber push connector (MPO) 512 (as shown in FIG. 5A). An "optical fiber ribbon," for the purpose of this disclosure, is a specialized cable consisting of a plurality of optical fibers bundled together in a flat, ribbon-like configuration. Each optical fibers of plurality of optical fibers may be made of glass or plastic. Each optical fibers of plurality of optical fibers may be configured to transmit light signals with very low loss over a long distances. In some embodiments, optical fiber ribbon may be used to transfer optical properties as described above from sensor device 124 to external device 504 through MPO 512. As used in this disclosure, a "multi-fiber push connector" is a connection component configured to connect optical fiber ribbon between apparatus 100 and external device 504. In some embodiments, MPO 512 may include a plug with a row of plurality of optical fibers that are aligned and held in place by precision pins. The connector typically consists of a plug with a row of plurality of optical fibers that are aligned and held in place by one or more precision pins, wherein the precision pins are pins used in manufacturing and assembly processes to ensure precise and accurate alignment of components such as, without limitation, plurality of optical fibers.

Still referring to FIGS. 5A-B, Additionally, or alternatively, connection between apparatus 100 and external device 504 may be accomplished via laser coupling process 500 (as shown in FIG. 5B). As used in this disclosure, a "laser coupling process" refers to a process of optically connecting or coupling external device 504 to sensor device 124 via light source 516. Light source 516 may include any light source as described in this disclosure. Data transfer between sensor device 124 and external device 504 via laser coupling process 500 may be referred to as a fibreless data transfer. In some embodiments, laser coupling 500 may be performed using one or more lens assemblies which are designed to precisely align laser beam with the input of the receiving component such as, without limitation, external device 504. The lens assembly may be used to collimate or focus the laser beam. In case of external device 504 containing light source 516, receiving component may include apparatus 100. In a non-limiting example, transferring data between external device 504 and apparatus 100 may include configuring light source 516 within external device 504 to irradiate a laser at sensor device 124. In some embodiments, light source 516 may include different orientations relative to connected component in laser coupling process 500. In a non-limiting example, laser coupling process 500 may include a horizontal laser coupling, wherein the horizontal laser coupling may include a horizontal orientation of light source and external device 504. In such embodiment, laser beam may be directed horizontally from lights source into the input of external device 504. In another non-limiting example, laser coupling process 500 may include a vertical (or edge) laser coupling, wherein the vertical laser coupling may include a vertical orientation of light source and external device 504. In such embodiment, laser beam may be directed vertically from light source into the input of external device 504. In a further embodiment, horizontal laser coupling and vertical laser coupling may be used in combination to achieve an optimal performance such as, without limitation, external device 504 may be configured to receive and/or transmit signals in multiple directions.

Figure 6:
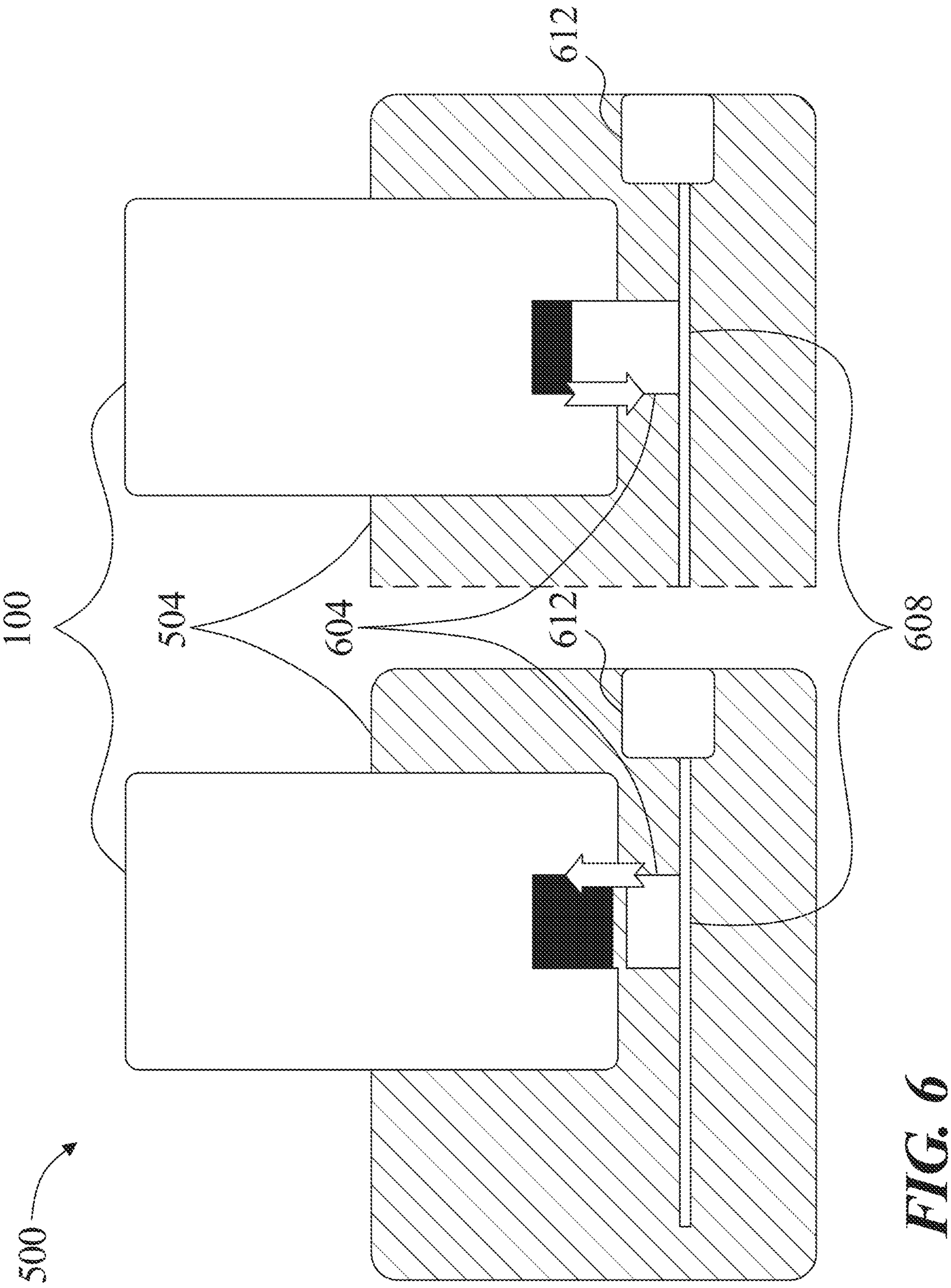
FIG. 6 is an exemplary embodiment of a mechanism that permits laser coupling.

Now referring to FIG. 6, an exemplary embodiment of a mechanism 600 that permits laser coupling process 500 is illustrated. The left of FIG. 6 shows a mechanism for vertical laser coupling or edge laser coupling. In some embodiments, optical device 604 may include a passive optical device. As used in this disclosure, a "passive optical device" is an optical device that does not require the use of active components, such as, without limitation, lasers, electro-optical modulators, and/or the like to manipulate light. In some embodiments, passive optical device may rely on inherent optical properties to control the behavior of light; for instance, inherent optical properties may include, without limitation, light refraction, light reflection, light diffraction, light absorption, light scattering, and the like thereof. In a non-limiting example, passive optical component may include, without limitation, lenses, prisms, mirrors, filters, gratings, waveguide, couplers, splitters, multiplexers, and the like thereof. Optical device 604 may be mounted on a band 608 that allows optical device 604 to automatically move laterally as needed for laser coupling process 500. As used in this disclosure, a "band" is a component configured to enable an object optical device 604 to move along like a track. In some embodiments, band 608 may include a pathway or a route that is designed or adapted to guide the movement of optical device 604 along a predetermined path. In some cases, band 608 may be alignment feature 116; for instance, and without limitation, band 608 may include a physical structure of housing 120 such as a groove, rail, or channel that provides a surface or support for optical device 604 to move on. Movement of optical device 604 on band 608 may be driven by a stepper motor 612. As used in this disclosure, a "stepper motor" is an electromechanical device that converts electrical signals into incremental rotational or linear motion. In some cases, stepper motor 612 may include a rotor, a stator, and a set of electromagnetic coils that interact to generate torque and control the movement of the motor. Stepper motor 612 may operate by moving in discrete steps or increments. In a non-limiting example, each step or increment of the stepper motor 612 may be controlled by a series of electrical pulses that causes the electromagnetic coils to energize and generate magnetic fields that attract or repel the rotor, depending on its position relative to the stator. Additionally, or alternatively, the right of FIG. 6 shows a mechanism for horizontal laser coupling where optical device, such as, without limitation, passive optical device may be on top of external device 504, similarly driven by stepper motor 612 and band 608. Further, this secondary and tertiary means of communication may require a lateral moving laser and passive optics system that adjusts to sensor positioning automatically.

Figure 7A:
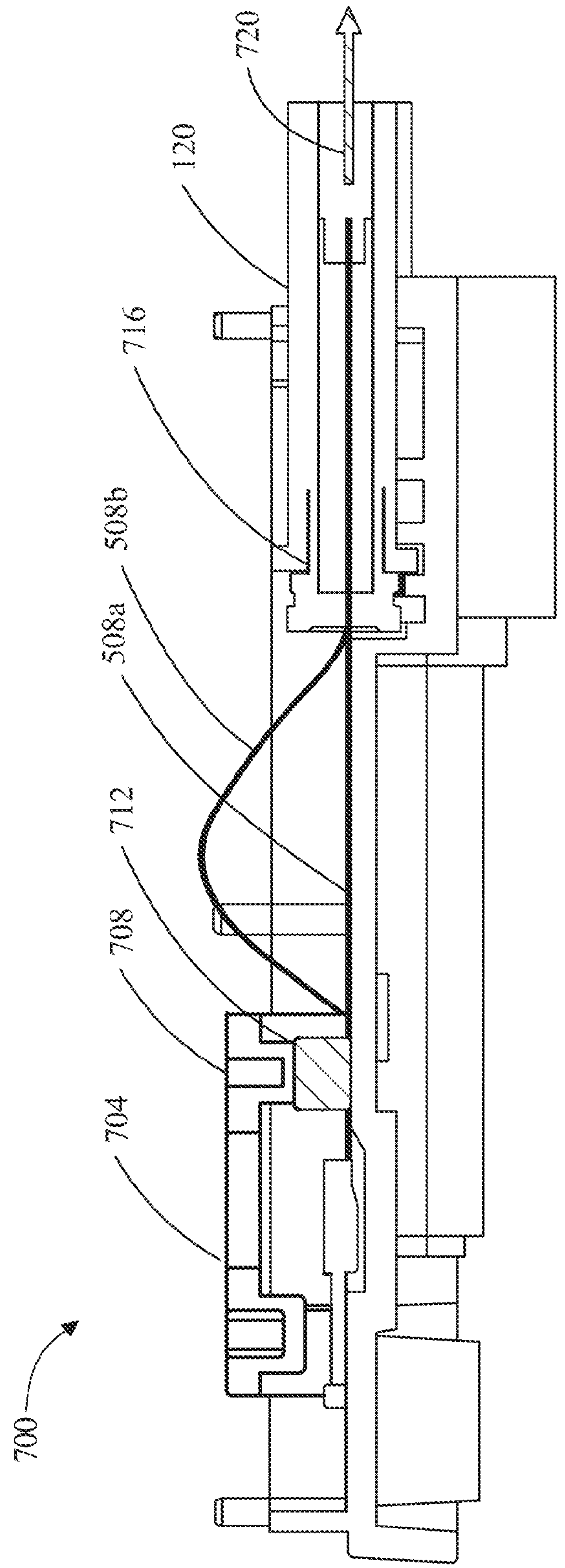
FIGS. 7A-B are exemplary embodiments of a mechanism for removing stress from fiber ribbon.
Figure 7B:
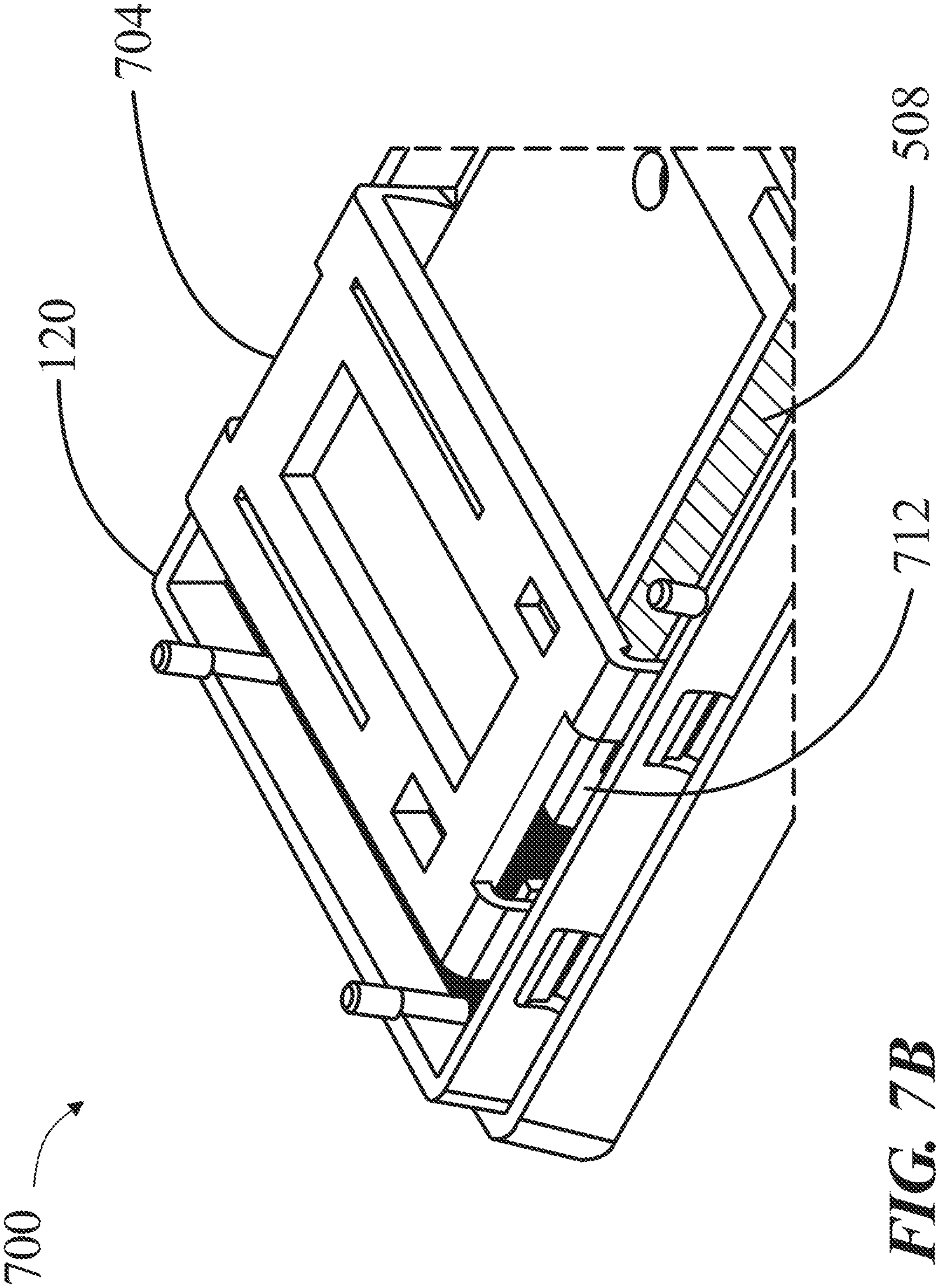

Now referring to FIG. 7A, an exemplary embodiment of a mechanism 700 of MPO 512 for removing stress from optical fiber ribbon 508*a-b* is illustrated. In some cases, Optical fiber ribbon 508*a-b* may include a stress (e.g., bending) due to large length tolerances for optical fiber ribbon 508*a-b*. In some embodiments, mechanism 700 for removing stress from optical fiber ribbon 508*a-b* may include a stress relief piece 704. As used in this disclosure, a "stress relief piece" is a device that is designed to reduce stress or strain in a particular part of apparatus 100, such as, without limitation, optical fiber ribbon 508*a-b*. In a non-limiting example, stress relief piece 704 may be configured to push optical fiber ribbon 508*a* downward to remove stress going to sensor device 124. Stresses of optical fiber ribbon 508*a* may be redirected to housing 120 with a clamp 708 that uses a flexible piece 712 such as, without limitation, a rubber, to push optical fiber ribbon 508*a* downwards to a piece holder 716 configured to hold sensor device 124 (e.g., bending optical fiber ribbon 508*a* to the position of optical fiber ribbon 508*b*). Additionally, or alternatively, MPO 512 may include a retractable piece holder 718 to avoid bending optical fiber ribbon 508*a-b* completely; for instance, and without limitation, piece holder 718 may be able to move in a direction 720 to alleviates stresses of optical fiber ribbon 508*a-b* thus allowing sensor device 124 to stay in place.

Now referring to FIG. 7A, a three-dimensional view of mechanism 700 of MPO 512 for removing stress from optical fiber ribbon 508 is illustrated. Mechanism 700 may include a stress relief piece 704 containing a clamp compressing a flexible piece 712 such as, without limitation, a rubber, configured to push optical fiber ribbon 508 downward to remove stress going to sensor device; therefore, redirecting stress to housing 120.

Figure 8A:
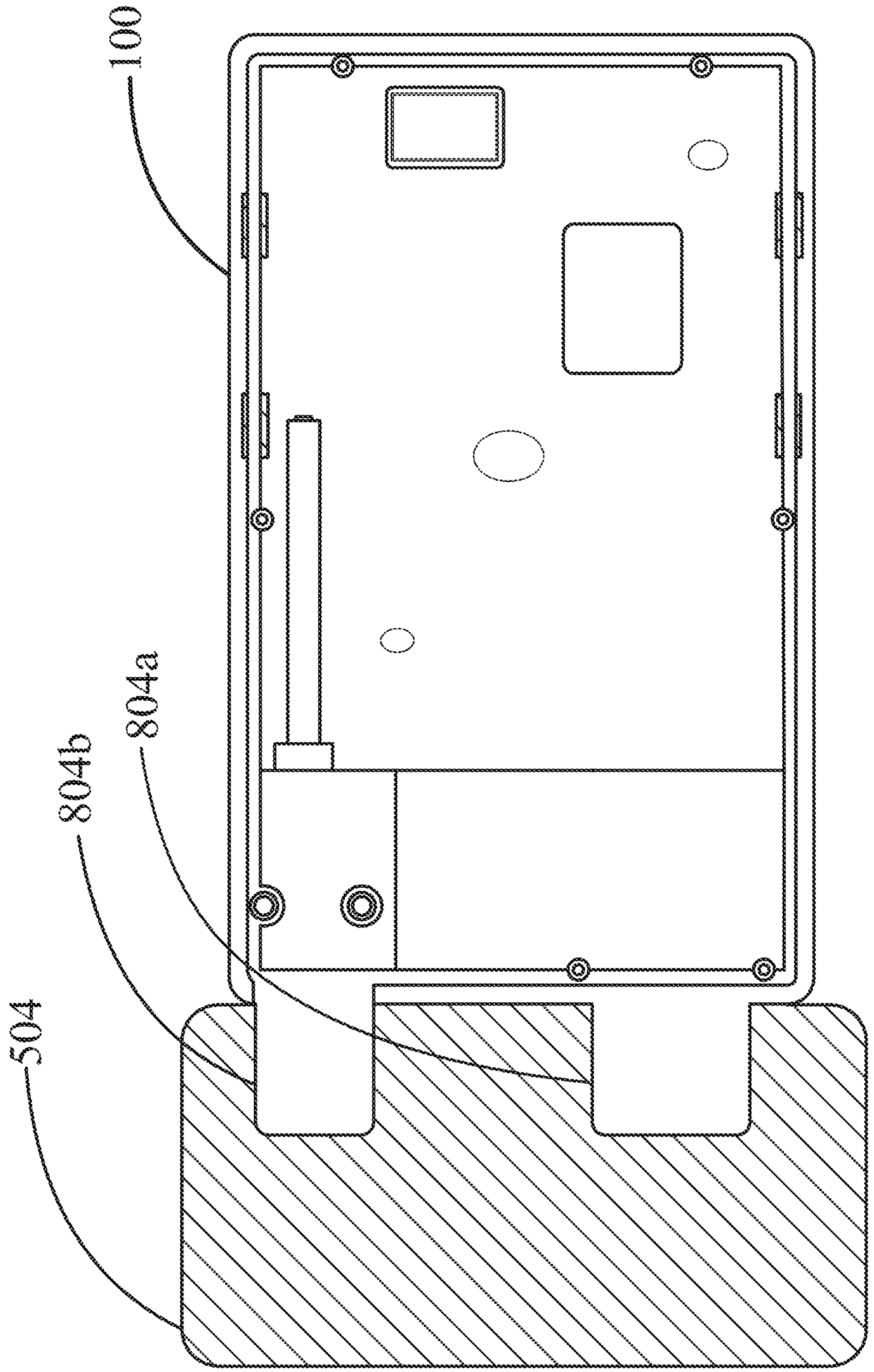
FIGS. 8A-C are exemplary embodiments of various alignment and locking mechanisms for connecting apparatus to external device.
Figure 8B:
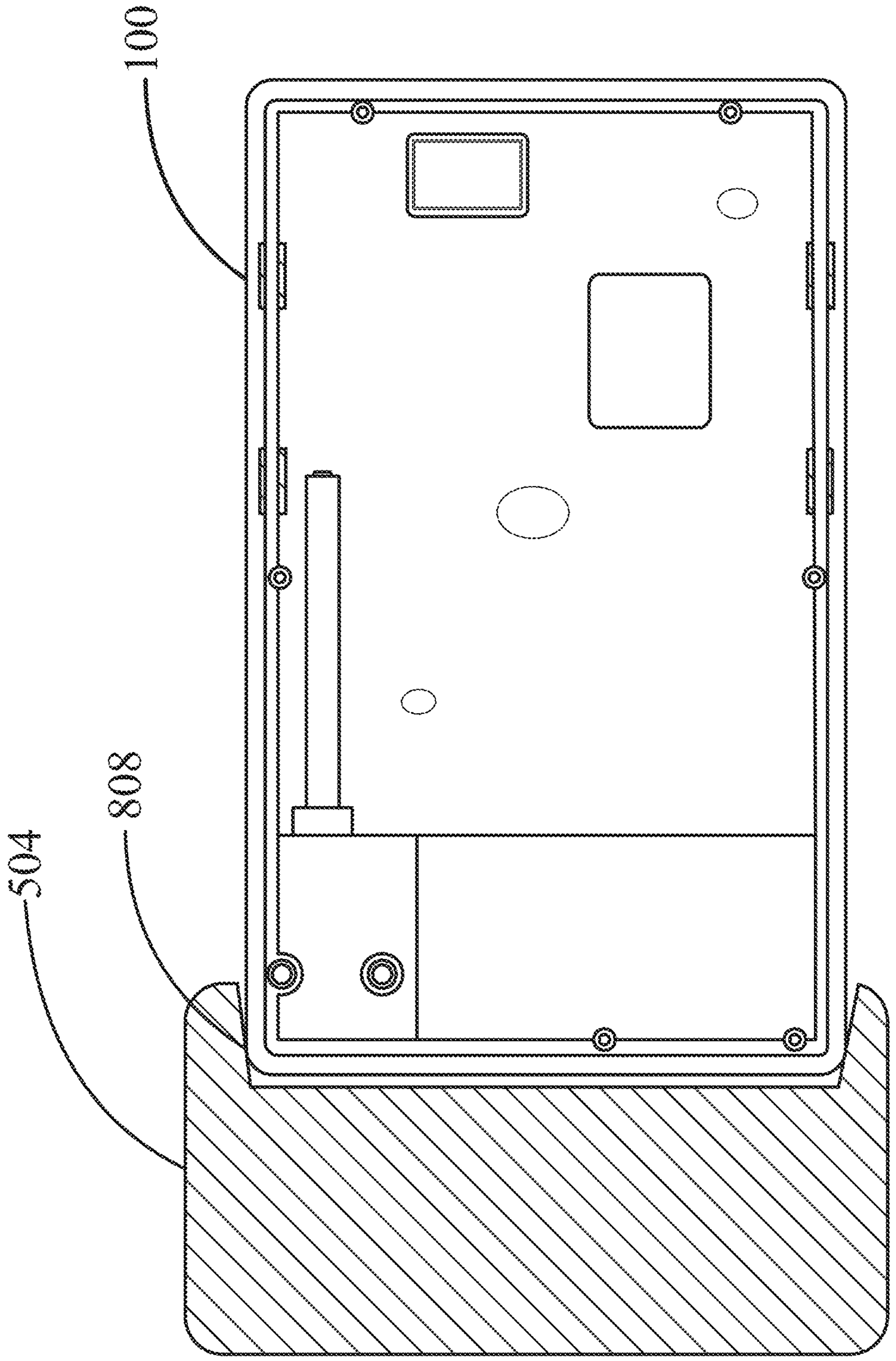
Figure 8C:
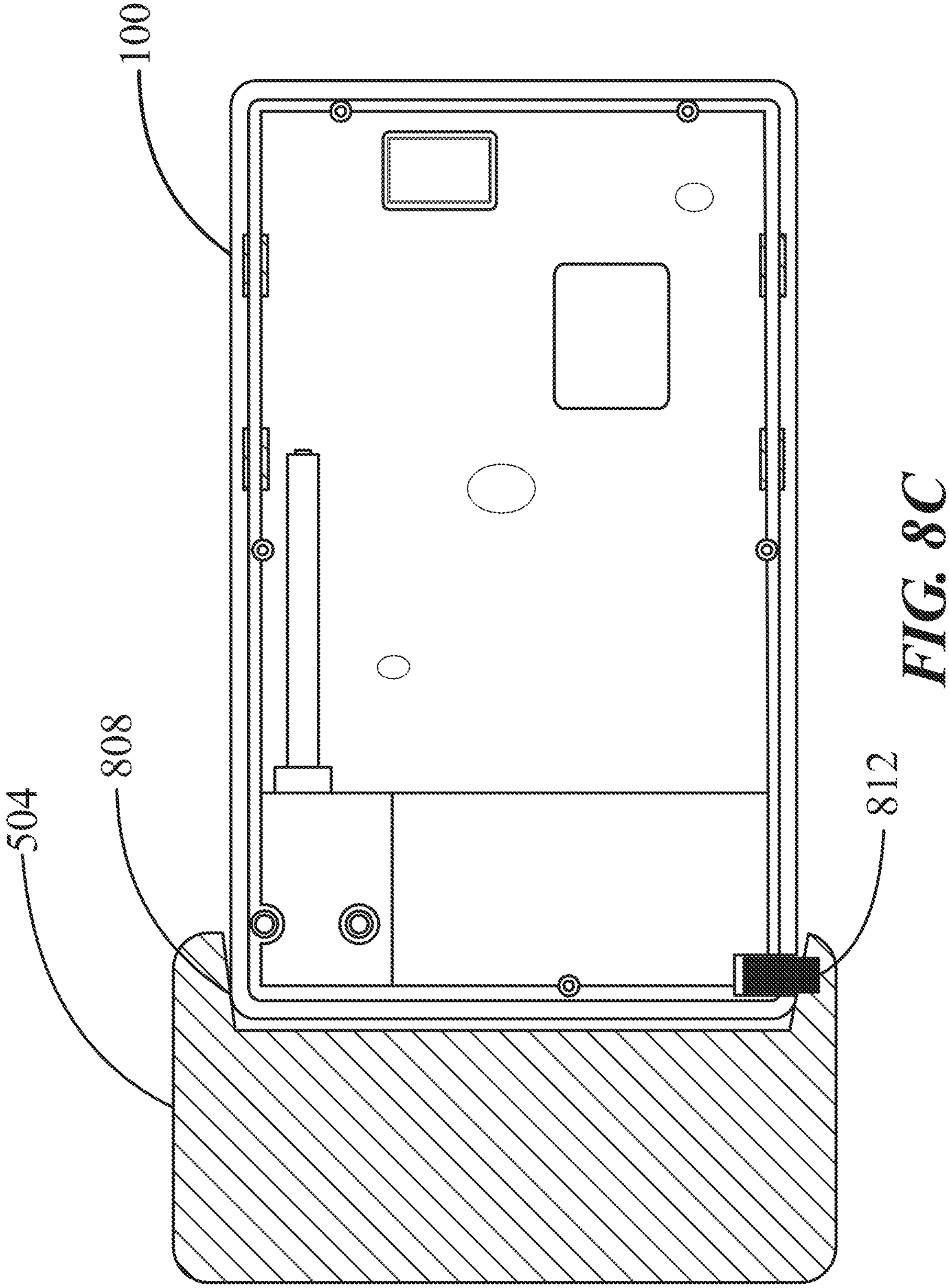

Now referring to FIG. 8A-C, exemplary embodiments of various alignment feature 116 for connecting apparatus 100 to external device 504 are illustrated. In some cases, MPO 512 may be used as alignment feature 116 for apparatus 100 to plug to external device 504 as described above in reference to FIG. 5A. In a non-limiting example, MPO 512 may be used as alignment feature 116 for connecting a cartridge (containing sensor device 124 and microfluidic environment) to an external reader. In such embodiment, MPO 512 may protrude outward beyond any other alignment features such as, without limitation, housing 120 and the like. MPO 512 may guide the alignment of apparatus 100 and external device 504, wherein the MPO may be the first alignment feature to make the connection between apparatus 100 and external device 508. Additionally, or alternatively, no MPO 512 may be needed for connecting between apparatus 100 and external device 508, meaning other alignment features can be used to guide alignment; for instance, and without limitation, using at least a bracket (as shown in FIG. 8A). As used in this disclosure, a "bracket" is an alignment feature that is used to support, attach, or otherwise secure two or more objects together. In a non-limiting embodiment, housing 120 may include a first bracket 804*a* and a second bracket 804*b*. Both brackets 804*a-b* may be configured to attach apparatus 100 to external device 504. In some case, both brackets 804*a-b* may be on the same side of housing 120. In other cases, first bracket 804*a* and second bracket 804*b* may differ in size. In a non-limiting example, each bracket may include a clamping surface configured to engage with a projection located on external device 504, wherein the "projection" is defined, for the purpose of this disclosure, is a female coupling interface configured to couple with the "clamping surface," for the purpose of this disclosure, a male coupling interface. In some cases, projection may be an opposite clamping surface designed to constrain clamping surface. Further, apparatus 100 may be directed and locked onto external device 504; for instance, and without limitation, with a press fit (as shown in FIG. 8B). In a non-limiting example, housing 120 and/or external device 504 may include a press fastener 808, wherein the "press fastener," for the purpose of this disclosure, is a fastener that couples a first surface and a second surface when the two surfaces are pressed together. In some cases, press fastener 808 may include an adhesive, wherein the adhesive may be entirely located on first surface or second surface of press fastener 808, allowing any surface that can adhere to the adhesive to secure the connection between apparatus 100 and external device 504. Attaching external device 504 to apparatus 100 may include press first surface/second surface of press fastener 808 against second surface/first surface of press fastener 808. In a further non-limiting embodiments, press fit for attaching apparatus 100 onto external device 504 may utilize a spring mechanism 812 (as shown in FIG. 8C). As used in this disclosure, a "spring mechanism" refers to a component that provides a resilient force or elastic deformation between force is applied to it. In a non-limiting example, spring mechanism 812 may include a spring configured to help maintain the connection between apparatus 100 and external device 504 by providing a continuous force to hold them together. Spring may include, without limitation, helical spring, wave spring, disc spring, and the like thereof. In other embodiments, alignment feature 116 described in this disclosure may include a "release mechanism," defined as a mechanism having a member which when pulled, cause the attachment/connection between apparatus 100 and external device to detach. Person skilled in the art, upon reviewing the entirety of this disclosure, will be aware of various alignment features that may be used for connecting apparatus 100 and external device 504.

Figure 9B:
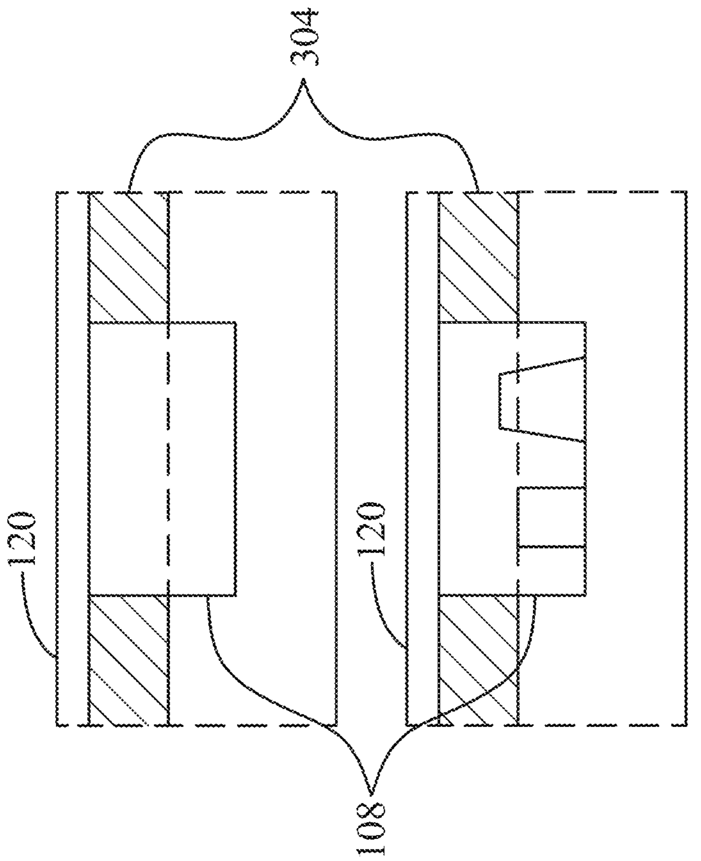
FIGS. 9A-B are lateral views of microfluidic features that may be manipulated to change flow parameters.
Figure 9A:
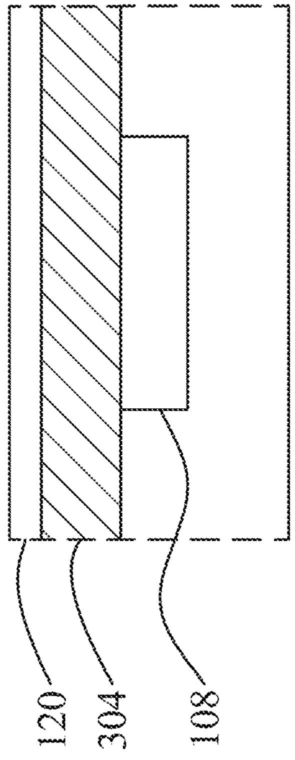

Now referring to FIGS. 9A-B, lateral views of microfluidic features 108 that may be manipulated to change flow parameters are illustrated. In a non-limiting embodiment, microfluidic device 104 may include microfluidic feature 108 on its surface to conduct flow towards sensor device 124 (as shown in FIG. 9A). For example, and without limitation, microfluidic feature 108 may include a microfluidic channel, wherein the microfluidic channel may be sealed by sealer 304 as described above, such as, without limitation, DSA. The other side of sealer 304 may be attached to housing 120. The dimensions of microfluidic feature 108 may vary depending on the flow, hydrophobicity, mixing, delay requirements, and/or the like of at least a fluid. For example, and without limitation, dimensions may include channel width, channel height, channel length, and the like. Alternatively, or additionally, microfluidic feature 108 may include feature terrain (as shown in FIG. 9B). As used in this disclosure, a "feature terrain" refers to one or more physical characteristics of the interior surface of microfluidic feature 108 such as, without limitation, microfluidic channel, that affect flow parameters of the flow of at least a fluid. In a non-limiting example, microfluidic feature may be created with carved microfluidic channels on the sealer 304 placed on a flat or reshaped surface and sealed with another laminate such as housing 120. In some cases, carved microfluidic channels may include feature terrain such as, without limitation, ridges, grooves, bumps, and/or any other surface irregularities that may be designed to manipulate the flow of at least a fluid for a particular application of microfluidic-based biochemical assay.

Figure 10A:
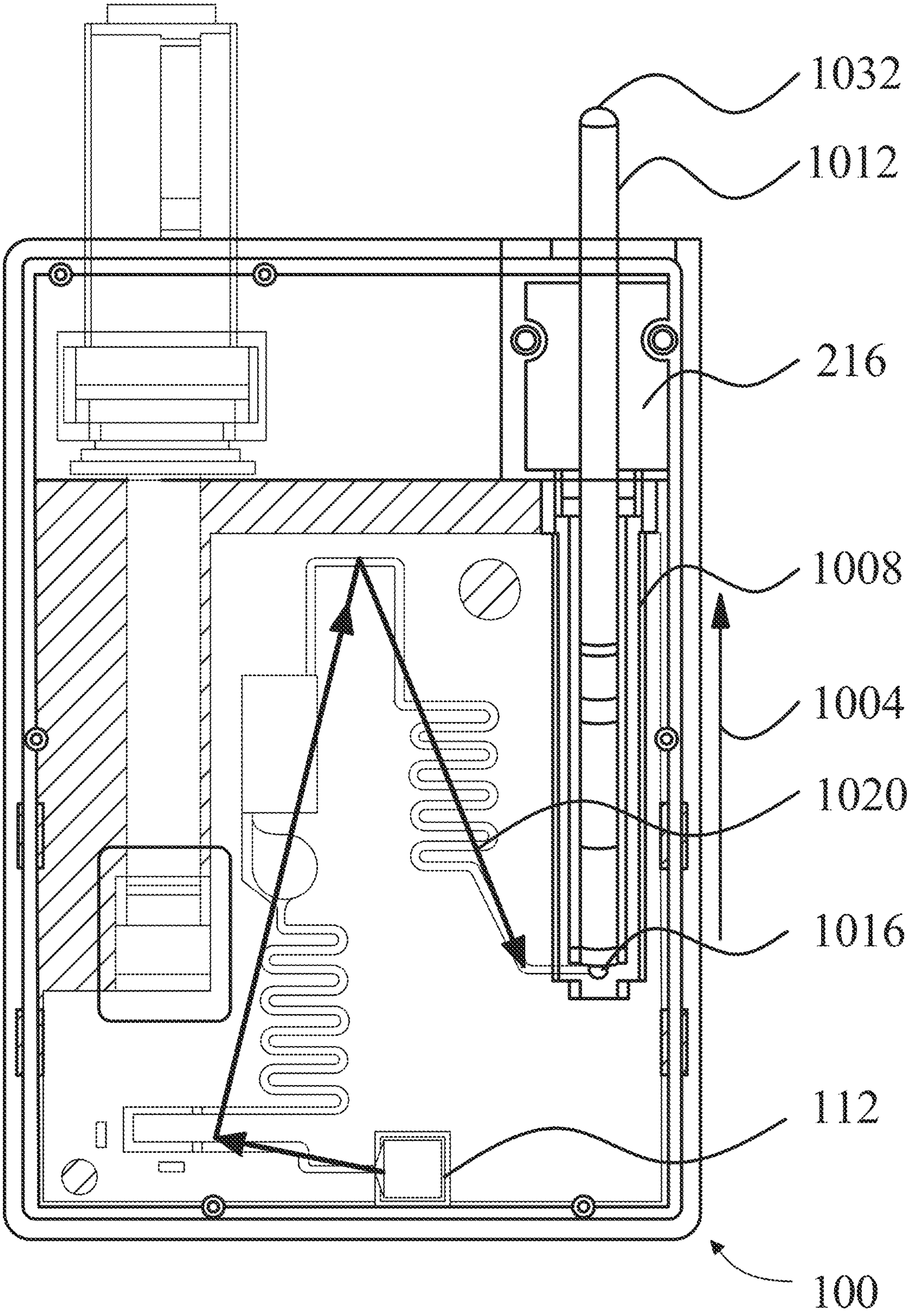
FIGS. 10A-B are exemplary embodiments, of an active flow component.

Now referring to FIG. 10A, an exemplary embodiments of active flow component 216 having a pull regime 1004 is illustrated. Active flow component 216 may include a barrel 1008 and a plunger 1012 inside the barrel 1008. As used in this disclosure, a "barrel" is a cylindrical container. A "plunger," as described herein, is a component which can be moved inside the barrel, letting the active flow component 216 draw in at least a fluid through an inlet/outlet 1016 of the active flow component 216. In some cases, inlet/outlet 1016 may be connected with microfluidic feature 108 as described above. As used in this disclosure, a "pull regime" is a mode of operation of active flow component 216 configured to create a flow of at least a fluid by actively pulling or drawing at least a fluid through microfluidic feature 108. In a non-limiting example, pull regime 1004 may be achieved through pulling plunger 1012 within barrel 1008 from a first position to a second position, wherein the first position may be before the second position within barrel 1008. In some embodiments, active flow component 216 with plunger 1012 may include a sealing mechanism, wherein the sealing mechanism may be configured to create a pressure difference between two different areas in active flow component 216. In some cases, barrel 1008 may include an inner diameter equal to the outer diameter of the plunger 1012. In a non-limiting example, outer surface of plunger 1012 may be in contact with inner surface of the barrel 1008, creating a partition within the barrel. Sealing mechanism may enable active flow component 216 to create the partition within barrel 1008 with a first pressure different than a second pressure outside the barrel and/or active flow component 216, wherein the first pressure may be smaller than the second pressure. In some embodiments, active flow process may include a reverse flow process 1020. Pull regime 1004 may allow for active flow component 216 to initiate the reverse flow process 1020. As used in this disclosure, a "reverse flow process" is an active flow process in a reverse direction, wherein the reverse direction is defined as a direction of at least a fluid out of reservoir 108 of microfluid device 104 to inlet/outlet 1016 of active flow component 216. In a non-limiting example, reverse flow process 304 may be initiated as a function of the movement of plunger 1012 within barrel 1008 from first position to second position in reverse direction.

Figure 10B:
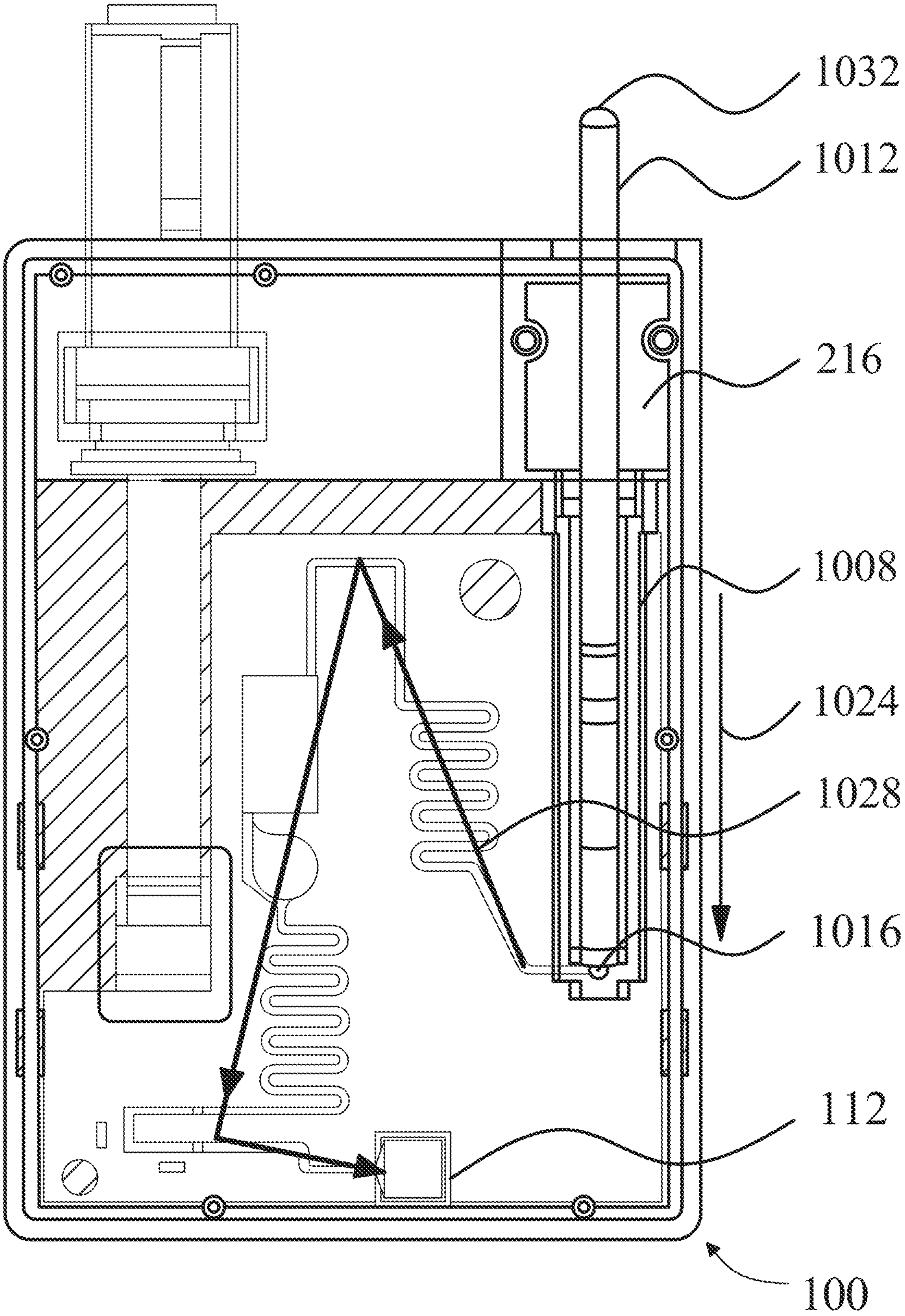

Now referring to FIG. 10B, an exemplary embodiments of active flow component 216 having a push regime 1024 is illustrated. As used in this disclosure, a "push regime" is a mode of operation of active flow component 216 configured to create a flow of at least a fluid by actively pushing or expel at least a fluid through microfluidic feature 108. In a non-limiting example, push regime 1024 may be achieved through pushing plunger 1012 within barrel 1008 from the second position back to the first position. Pushing regime 1024 may reduce pressure within the partition which leads at least a fluid within the partition to be expelled out of active flow component 216 from inlet/outlet 1016 into microfluidic channel 108. In some embodiments, active flow process may include a forward flow process 1028. As used in this disclosure, a "forward flow process" is an active flow process in a forward direction, wherein the forward direction is defined as a direction of at least a fluid into reservoir 112 of microfluid device 104 from active flow component 216. In a non-limiting example, forward flow process 1028 may be initiated as a function of the movement of plunger 204 within barrel 208 from second position back to first position in forward direction. The ability to reverse flow (e.g., via pull regime 1004 or push regime 1024) may allow for any number of assay steps as described below in reference to FIGS. 19-21 (e.g., single or multi-step assays).

With continued reference to FIGS. 10A-B, pull regime 1004 and/or push regime 1024 of active flow component 216 may be driven by an actuator, wherein the actuator may be connected to plunger 1012 through a mechanical interface 1032. As used in this disclosure, an "actuator" is a device that produces a motion by converting energy and signals going into the system. In some cases, motion may include linear, rotatory, or oscillatory motion. Actuator may include a component of a machine that is responsible for moving and/or controlling a mechanism or system. Actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, actuator responds by converting source power into mechanical motion. In some cases, actuator may be understood as a form of automation or automatic control. Additionally, or alternatively, actuator may be enclosed by housing 120. In such embodiment, housing 120 may protect actuator from damage by external factors.

With continued reference to FIG. 10A-B, in some embodiments, actuator may include a hydraulic actuator. A hydraulic actuator may consist of a cylinder or fluid motor that uses hydraulic power to facilitate mechanical operation. Output of hydraulic actuator may include mechanical motion as described above. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIGS. 10A-B, in some embodiments, actuator may include a pneumatic actuator. In some cases, a pneumatic actuator may enable considerable forces to be produced from relatively small changes in gas pressure. In some cases, a pneumatic actuator May respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIGS. 10A-B, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

With continued reference to FIGS. 10A-B, in some embodiments, actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like. In a non-limiting example, actuator may include a linear actuator. As used in this disclosure, a "linear actuator" is an actuator that creates linear motion. Linear actuator may create motion in a straight line; for instance, and without limitation, active flow component 216, particularly, plunger 1012 and/or barrel 1008 may be aligned with the straight line. Pull regime 1004 and/or push regime 1024 may be driven by such linear actuator. Actuator may include any actuator described in U.S. patent application Ser. No. 18/107,135.

With continued reference to FIGS. 10A-B, a "mechanical interface," for the purpose of this disclosure, is a component configured to connect at least two components. In an embodiment, mechanical interface 1032 between plunger 1012 and actuator may be a friction fit, an interference fit, or a snap fit, wherein plunger 1012 may include a male or female adapter and the actuator 120 may include a female or male adapter. For example, and without limitation, when the male (female) adapter engages with the female (male) adapter a mechanical connection is established. This mechanical connection can be designed so that it automatically disengages when a certain level of force is applied. Alternatively, it can be designed so that a mechanical input is necessary to cause the male and female connectors to disengage. In some embodiments, this mechanical coupling between plunger 1012 and actuator may be accomplished by other means (e.g., a Janney coupler, knuckle coupler, etc.). In other embodiments, mechanical coupling between plunger 1012 and actuator may be accomplished by a magnet or multiple magnets.

Figure 11A:
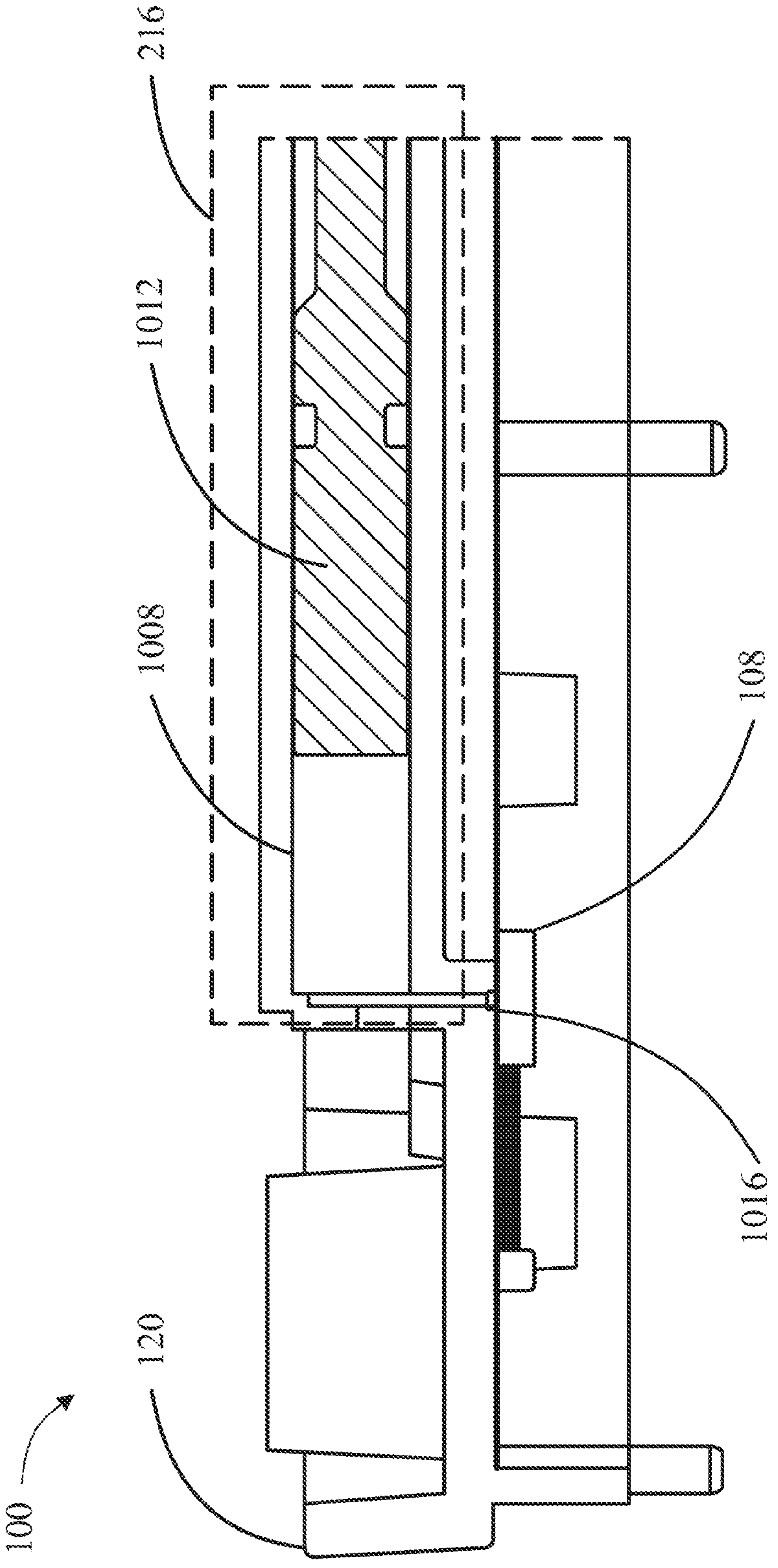
FIGS. 11A-B are exemplary embodiments of an active flow component connected to at least a microfluidic feature.
Figure 11B:
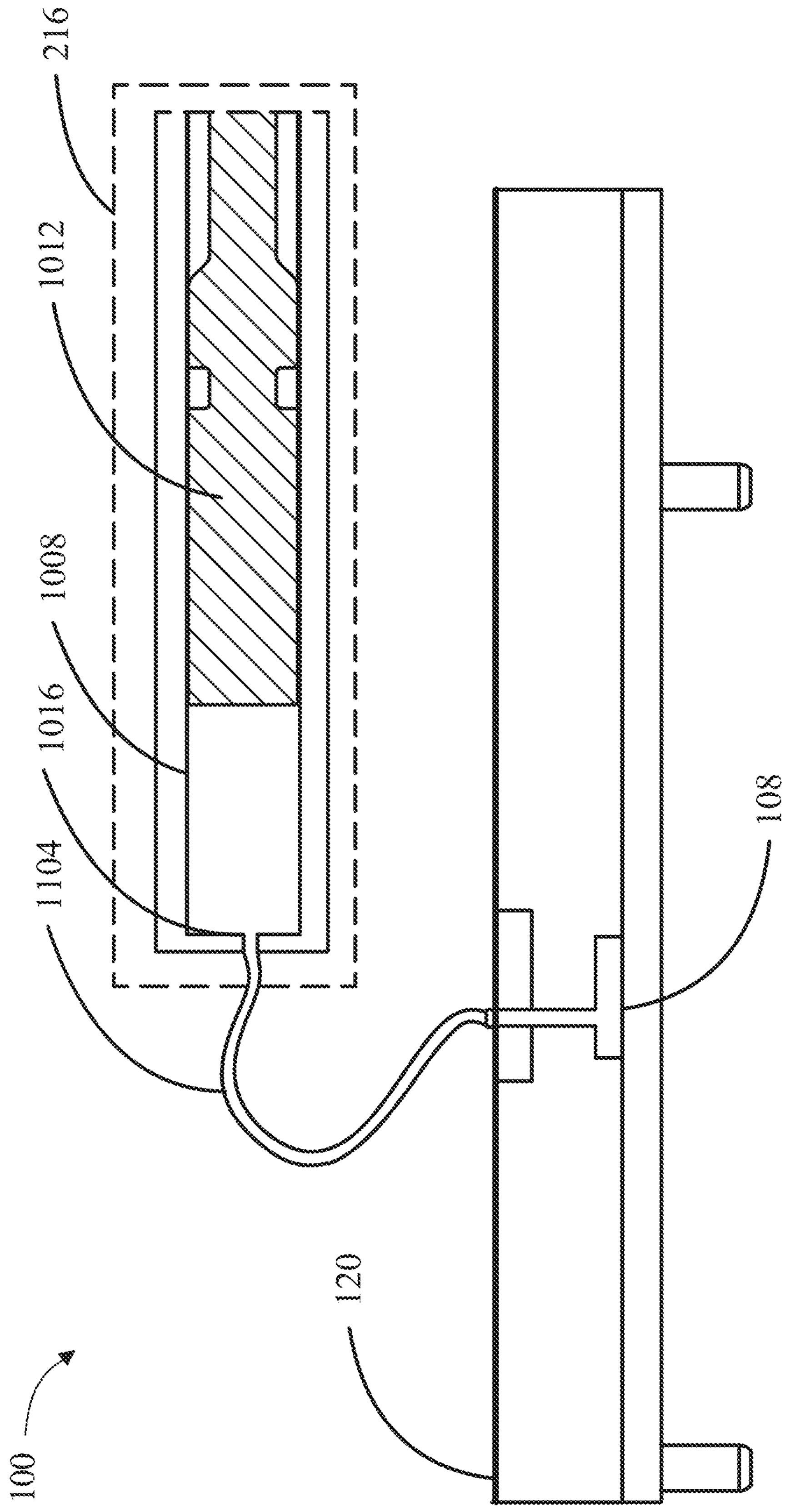

Now referring to FIGS. 11A-B, exemplary embodiments of active flow component 216 connected to at least a microfluidic feature 108 are illustrated. In some embodiment, active flow component 216 may be integrated within apparatus 100 (as shown in FIG. 11A). Inlet/outlet 1016 of active flow component 216 may be connected to at least a microfluidic feature 108 such as, without limitation, microfluidic channel. In some case, at least a fluid may flow from at least a microfluidic feature 108 through inlet 1016 into active flow component 216 during reverse flow process 1020 initiated by pull regime 1004 as described above. In other cases, at least a fluid may flow from active flow component 216 through outlet 1016 into at least a microfluidic feature 108 during forward flow process 128 initiated by push regime 1024 as described above. Additionally, or alternatively, active flow component 216 may not be integrated within apparatus 100 but may have a connection with at least a microfluidic feature 108 (as shown in FIG. 11B). In a non-limiting example, active flow component 216 may be disposed on the exterior of apparatus 100. A tube 1104 may be used to connect fluidically active flow component 216 to apparatus 100. For the purpose of this disclosure, a "tube" is a hollow cylindrical component configured to transport at least a fluid. In some cases, tube 1104 may be flexible; for instance, tube may be made of plastic. In a non-limiting example, one end of tube 1104 may be connected with inlet/outlet 1016 of active flow component 216 and another end of tube 1104 may be connected with at least a microfluidic feature 108. In other cases, tube 1104 may include an external extension of microfluidic feature 108.

Figure 12:
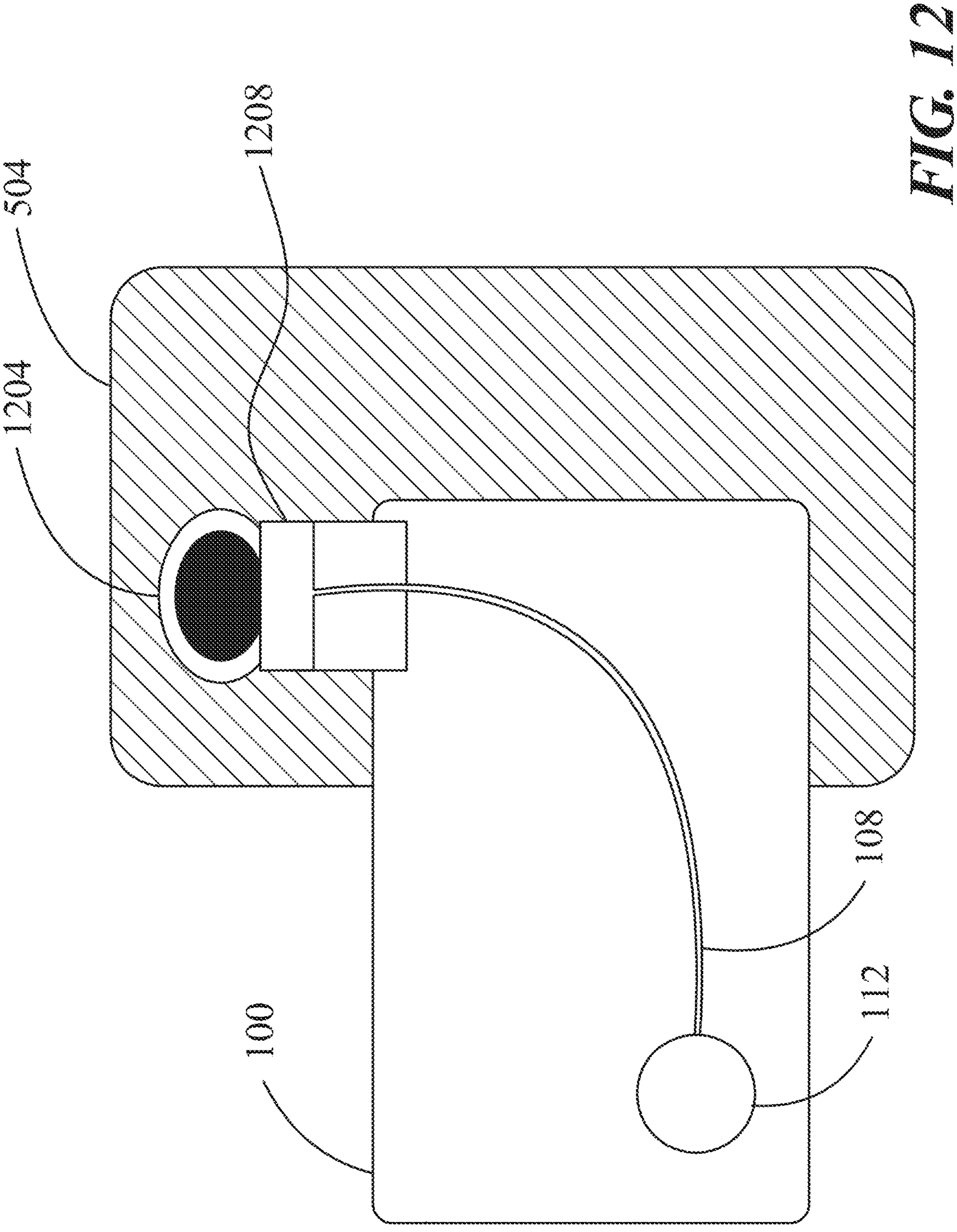
FIG. 12 is an exemplary embodiment of a liquid pump integrated on external device.

Now referring to FIG. 12, an exemplary embodiment of a liquid pump 1204 integrated on external device 504 is illustrated. In some embodiments, active flow component 216 may be integrated within external device 504. In a non-limiting example, active flow component 216 may include a liquid pump 1204, wherein the liquid pump 1204 may be integrated within external device 504 and connected to at least a microfluidic feature 108 of apparatus 100 through a pump interface 1208. Liquid pump may include any pump described in this disclosure. In some embodiments, liquid pump 1204 may be configured to transport at least a fluid from one location to another by means of mechanical or electrical energy; for instance, and without limitation, liquid pump 1204 may be configured to transport at least a fluid from reservoir 112 to pump interface 1208, or another way around, wherein the "pump interface," for the purpose of this disclosure, is a mechanism that connects liquid pump 1204 to at least a microfluidic feature 108 such as, without limitation, microfluidic channel, reservoir 112, and the like thereof. In some embodiments, pump interface 1208 may include, without limitation, piping, valves, flanges, connectors, fittings, and/or any other components that are configured to ensure a secure and reliable connection between liquid pump 1204 and microfluidic feature 108. Additionally, or alternatively, apparatus 100 may utilize passive flow component 212 (i.e., capillary action and wicking) to drive fluid flow while apparatus 100 is connected to external device 504 as described above.

Figure 13:
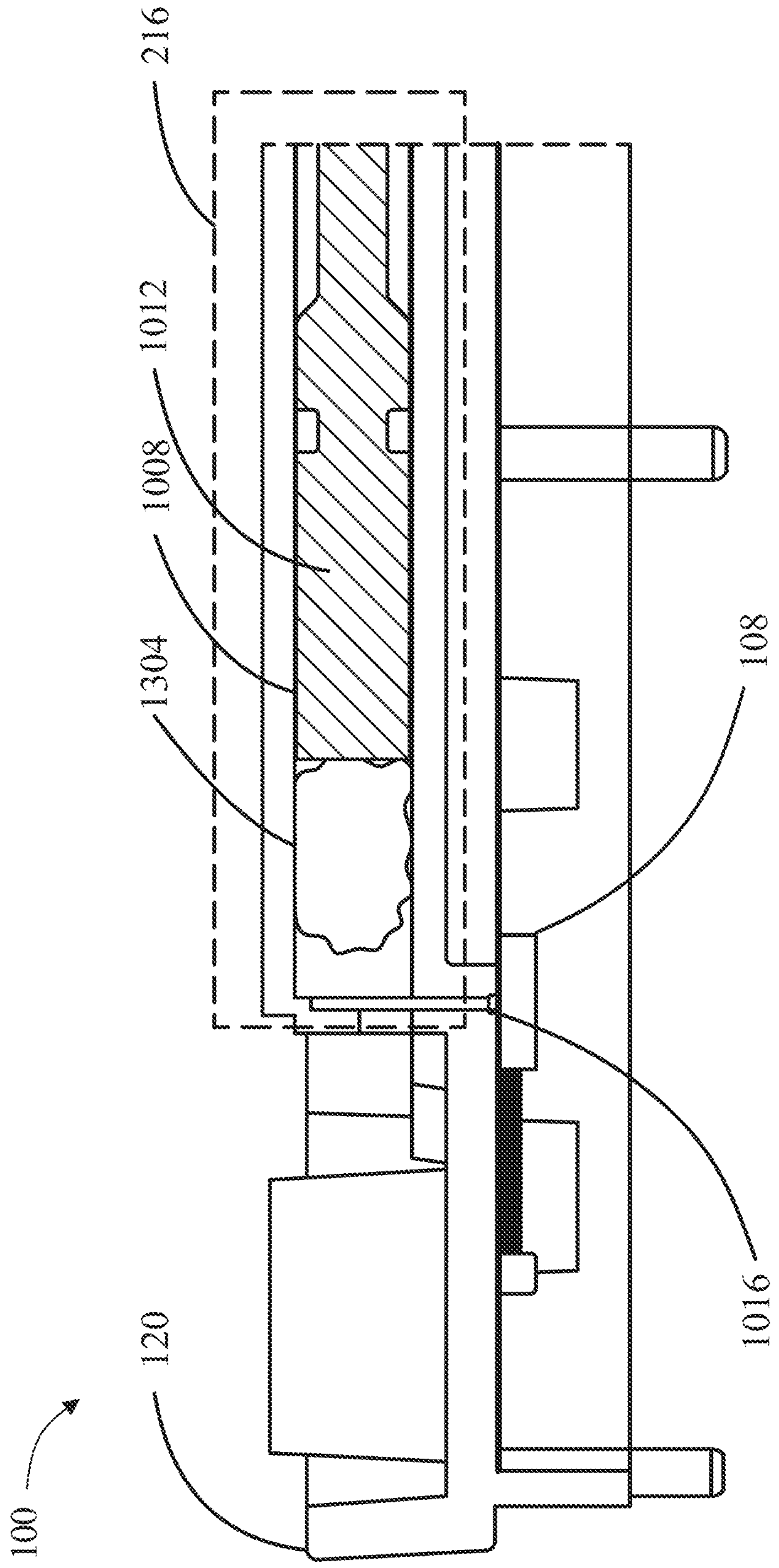
FIG. 13 is an exemplary embodiment of active flow component utilizing a bubble barrier.

Now referring to FIG. 13, an exemplary embodiment of active flow component 216 utilizing a bubble barrier 1304 is illustrated. In some embodiments, bubble barrier 1204 may include a stream of bubbles to prevent migration of pollutants from at least a microfluidic feature 108 through inlet/outlet 1016. In some cases, pollutants may include, without limitation, oil, debris and/or any other fluids. In a non-limiting example, bubble barrier 1304 may be utilized to separate assay buffer fluid from plunger 1012 within barrel 1008 of active flow component 216 to avoid any contamination. In some cases, bubble barrier 1304 may also act as a buffer for any steeped actions of plunger 1012 movement in order to create consistent flow.

Figure 14A:
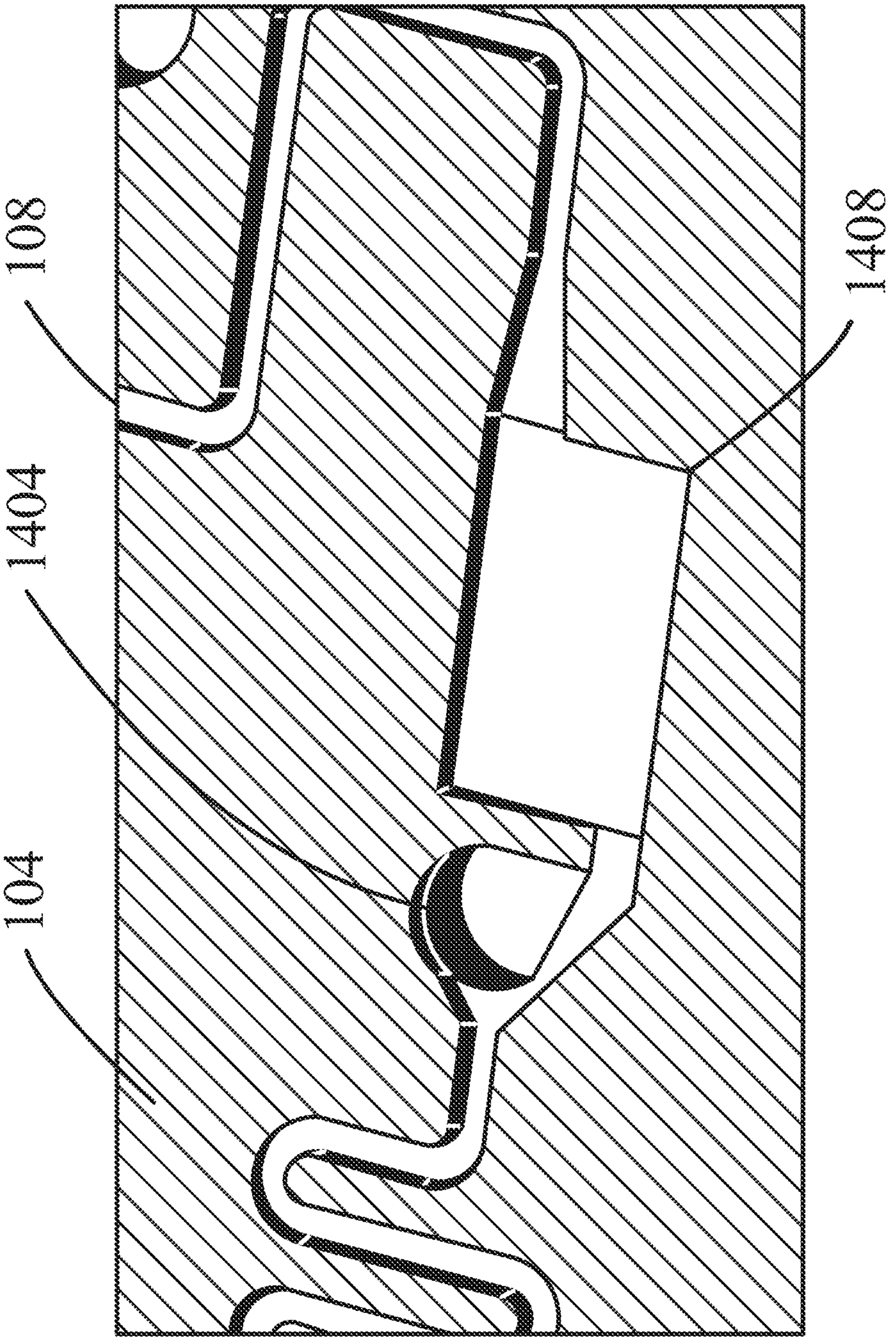
FIG. 14A-E are exemplary embodiments of various geometries for bubble trap.
Figure 14B:
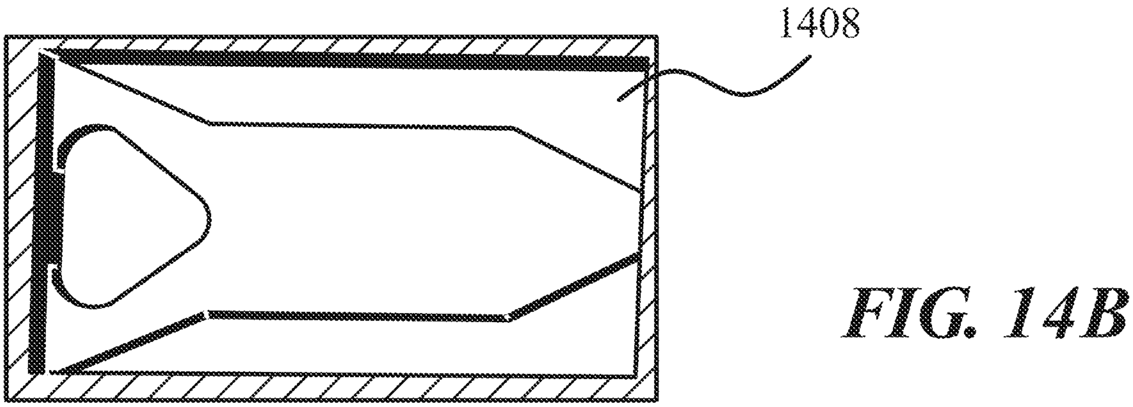
Figure 14C:
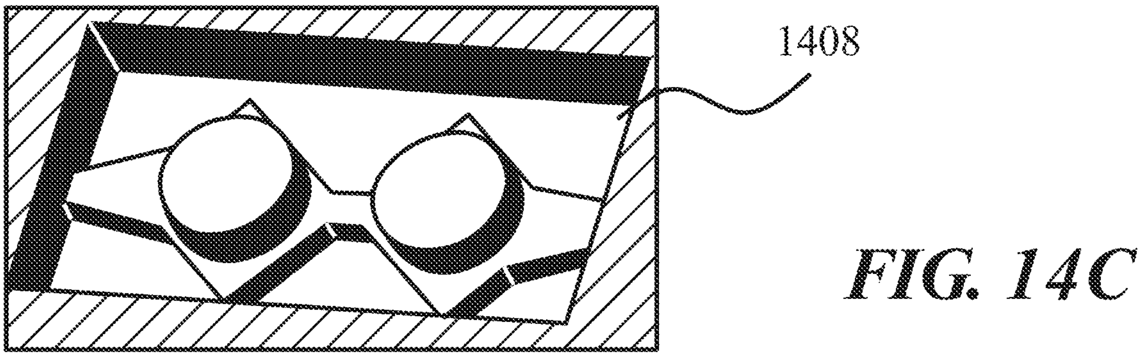
Figure 14D:
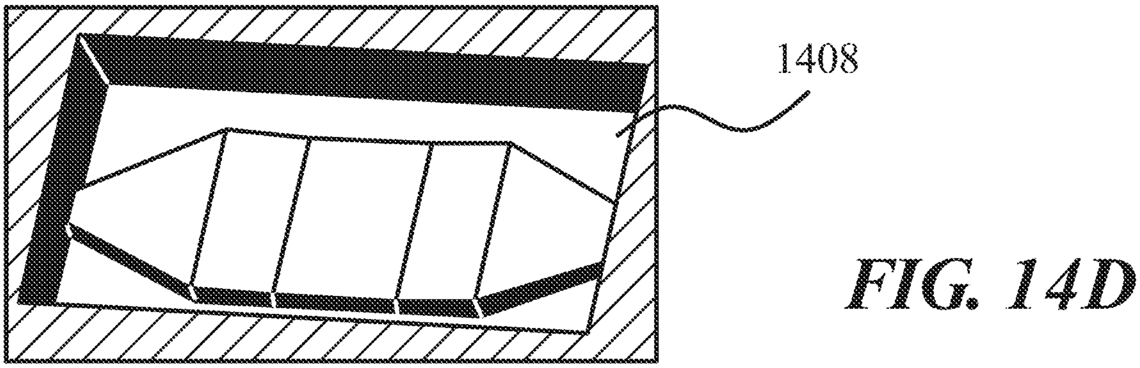
Figure 14E:
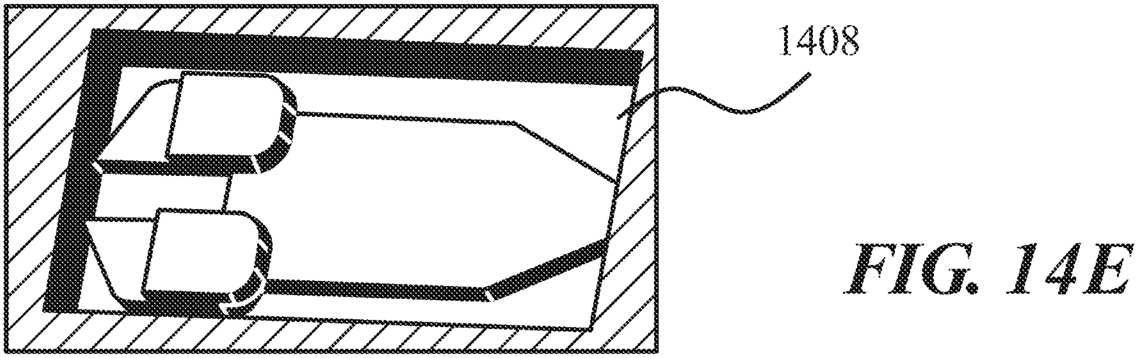

Now referring to FIGS. 14A-E, exemplary embodiments of bubble trap 1404 used in low flow application are illustrated. As used in this disclosure, a "bubble trap" is a microfluidic feature 108 configured to prevent the formation or accumulation of air bubbles in microfluidic channels of microfluidic device 104. In some cases, bubble trap 1404 may be connected to microfluidic feature 108. In other cases, microfluidic feature 108 may incorporate bubble trap 1404; for instance, and without limitation, microfluidic feature 108 may include a portion of the microfluidic feature 108 with a different feature terrain as described above, such as a groove, ridges, bumps, and/or any other surface irregularities as shown in FIG. 14A. In some embodiments, bubble trap 1404 may be used in low flow applications so that wicking does not create air bubbles in microfluidic channel. In some embodiments, the geometries of microfluidic features 108 (i.e., feature terrain) may be designed in such a way as to enhance reagent release from a conjugate pad 1408. A "conjugate pad" is a component of configured to house or apply at least a fluid such as, without limitation, a test sample. In some cases, reagents may include a mixture of a target-specific binding agent such as, without limitation, antibody, aptamer, and a detectable label such as a fluorescent label, chromogenic label, enzymatic label, and the like. In some embodiment, conjugate pad 1408 may be configured to provide a consistent and controlled microfluidic environment for reagents; for instance, and without limitation, by controlling the amount and rate of reagents delivery. In other embodiments, conjugate pad 1408 may provide a surface or support for reagents to interact with at least a fluid during flow process. Additionally, or alternatively, bubble trap 1404 may be integrated with conjugate pad 1408 as shown in FIGS. 14B-E. Further, reagents needed for assay may be directly deposited and dried in conjugate pad 1408.

Figure 15C:
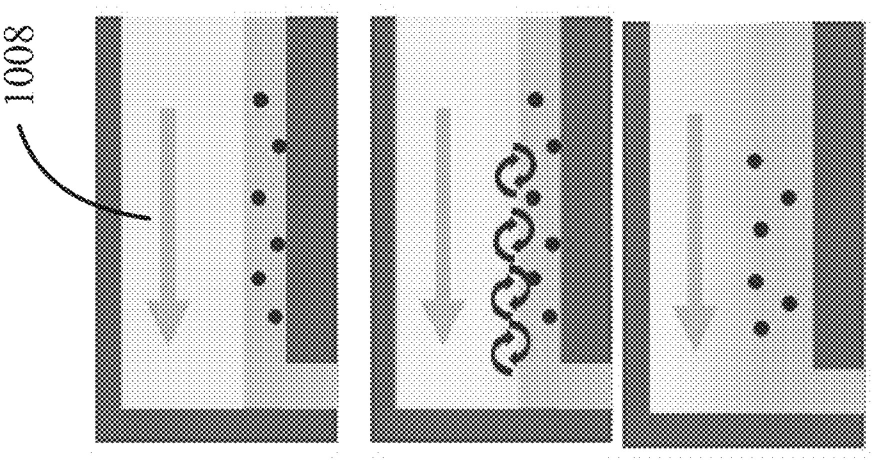
FIGS. 15A-C are exemplary embodiments of plurality of microfluidic features that may be utilized for both lateral and longitudinal mixing.
Figure 15B:
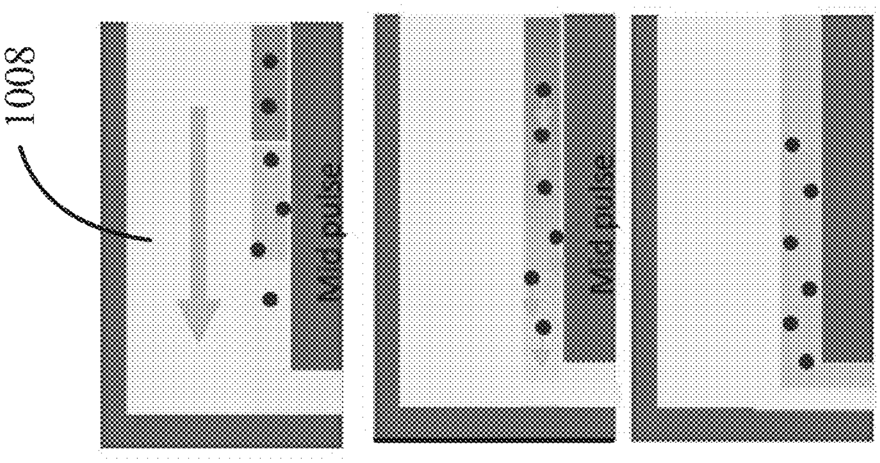
Figure 15A:
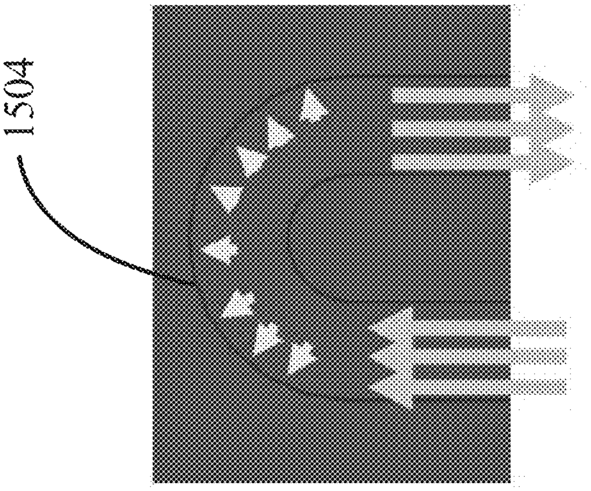

Now referring to FIGS. 15A-C, exemplary embodiments of plurality of microfluidic features 108 that may be utilized for both lateral and longitudinal mixing are illustrated. In some embodiments, flow component 128 may be configured to mix a first fluid with a second fluid, wherein the first fluid may include a sample fluid with a conjugate reagent, applied by conjugate pad 1408 as described above, and the second fluid may include a buffer fluid. Mixing of the first fluid and the second fluid may occur during either reverse flow process 1020 or forward flow process 1028. In some embodiments, at least a microfluidic features 108 may include one or more serpentines 1504 (as shown in FIG. 15A), wherein the "serpentine," for the purpose of this disclosure, refers to a specific configuration or pattern of channels in microfluidic device 104. In some embodiments, serpentine 1504 may be configured to provide a large surface area for fluid mixing. In other embodiments, serpentine 1504 may be configured to increase the residence time of fluids within microfluidic features 108. In some cases, serpentines 1504 may be formed by a series of interconnected loops or meanders that create a tortuous path for fluids to flow through. Serpentis 1504 may be designed and/or optimized to achieve desired fluid property such as, without limitation, mixing efficiency, reaction kinetics, separation performance, and the like thereof. In a non-limiting example, serpentines 1504 may be used for lateral mixing, wherein the "lateral mixing," as described herein, is a process for achieving uniform distribution of one or more fluids by mixing fluids horizontally. Additionally, or alternatively, mixing first fluid with second fluid may further include mixing first fluid with second fluid as a function of a longitudinal mixing in flow component 128, wherein the "longitudinal mixing," as described herein, is a process for achieving uniform distribution of one or more fluids by mixing fluids vertically. In a non-limiting example, longitudinal mixing may occur within barrel 100, wherein rapid flow pulses may cause conjugates to move turbulently due to inertia (as shown in FIG. 15B) and interfacial friction (as shown in FIG. 15C). Other means of mixing are described in further detail with reference to FIG. 17.

Figure 16A:
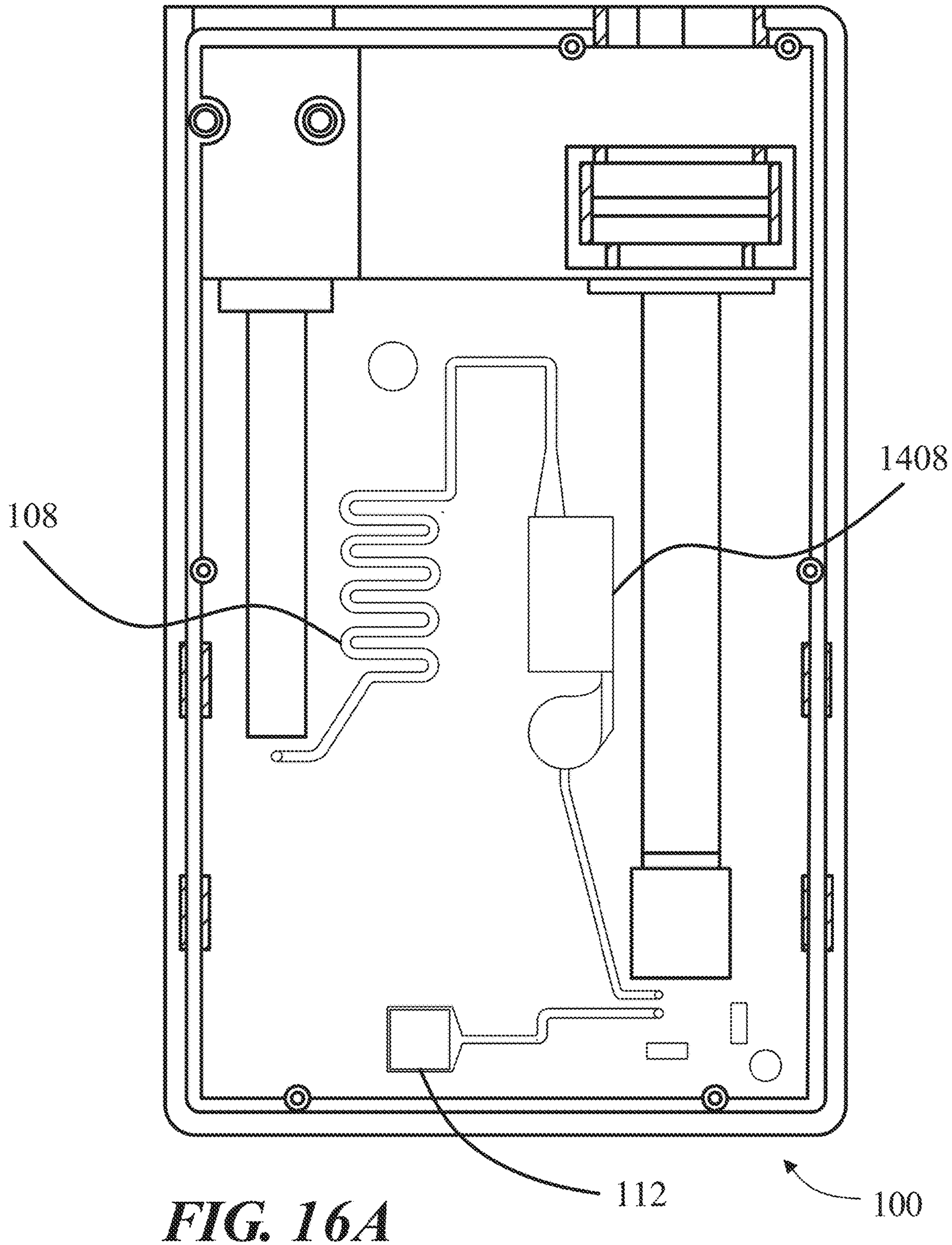
FIGS. 16A-C are exemplary embodiments of relational placements of plurality of microfluidic features before, after, or both to a conjugate pad.
Figure 16B:
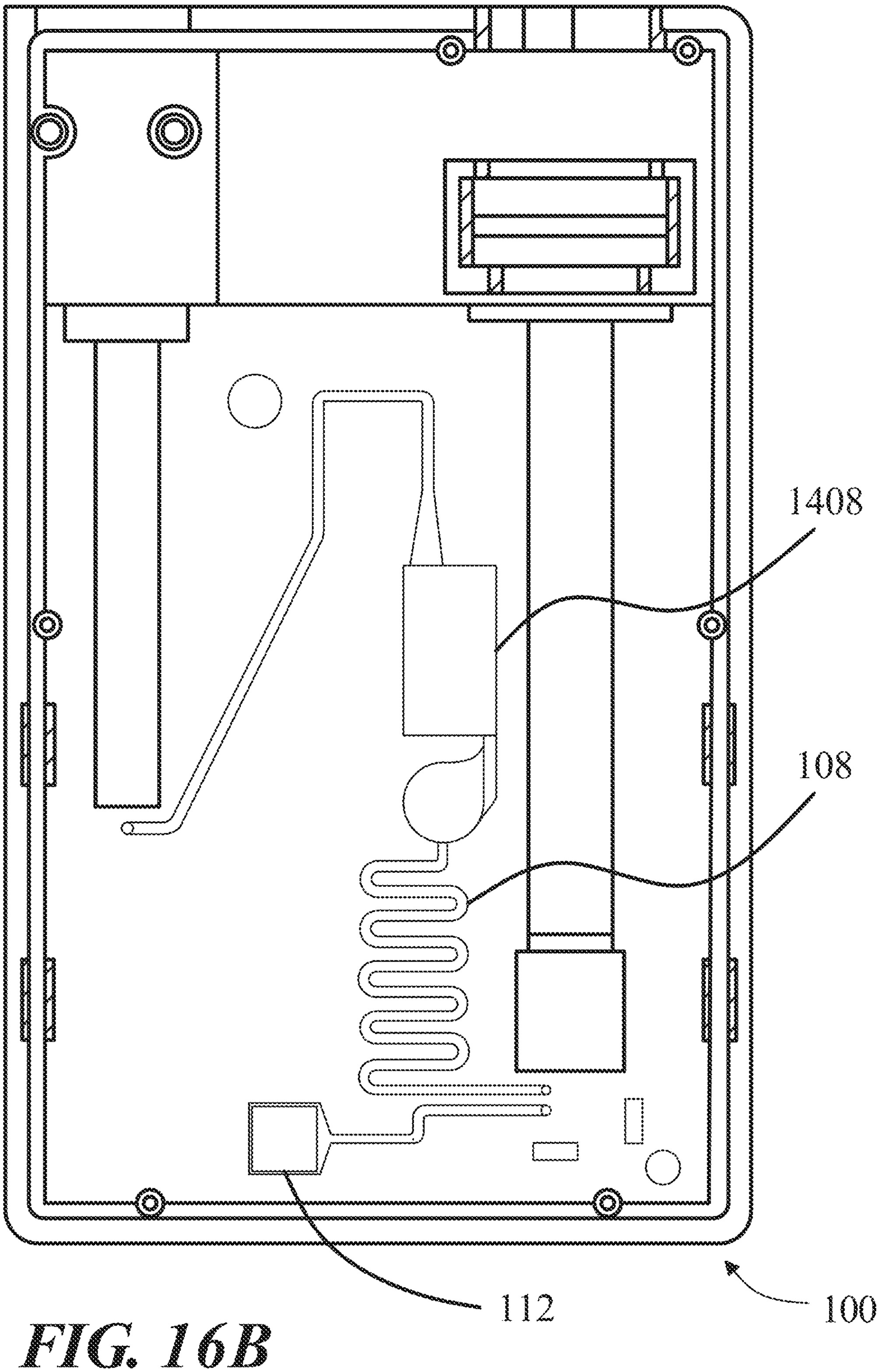
Figure 16C:
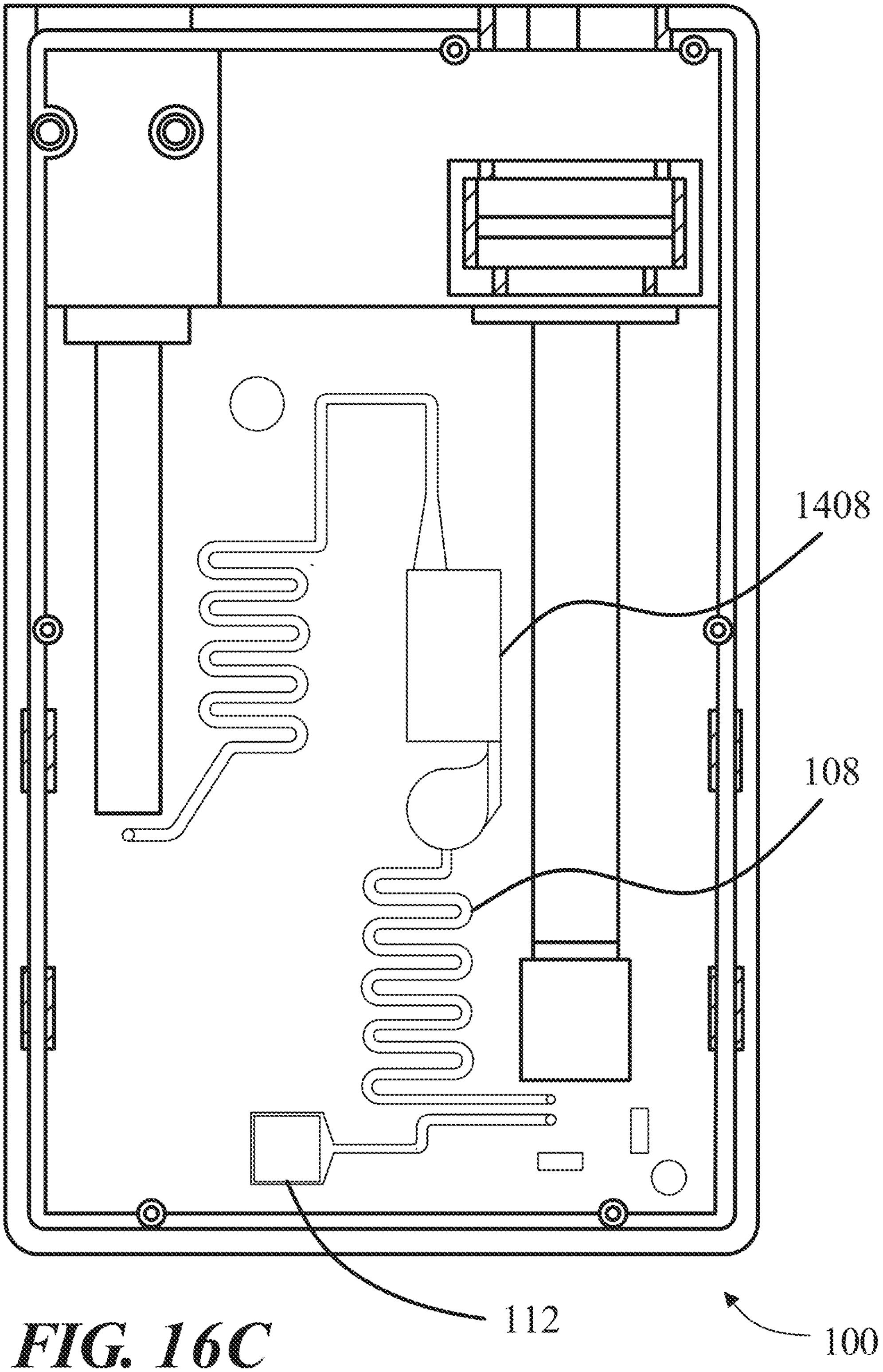

Now referring to FIG. 16A-C, exemplary embodiments of relational placement 1800*a-c* of plurality of microfluidic features before, after, or both to conjugate pad 1408 are illustrated. In some embodiment, plurality of microfluidic features 108 including a plurality of serpentines 1504 may be placed before conjugate pad 1408 (as shown in FIG. 16A). In some embodiments, plurality of microfluidic features 108 including a plurality of serpentines 1504 may be placed after conjugate pad 1408 (as shown in FIG. 16B). In other embodiments, plurality of microfluidic features 108 including a plurality of serpentines 1504 may be placed before and after conjugate pad 1408 (as shown in FIG. 16C). Plurality of serpentines 1504 may enable lateral mixing of first fluid and second fluid as described above.

Figure 17:
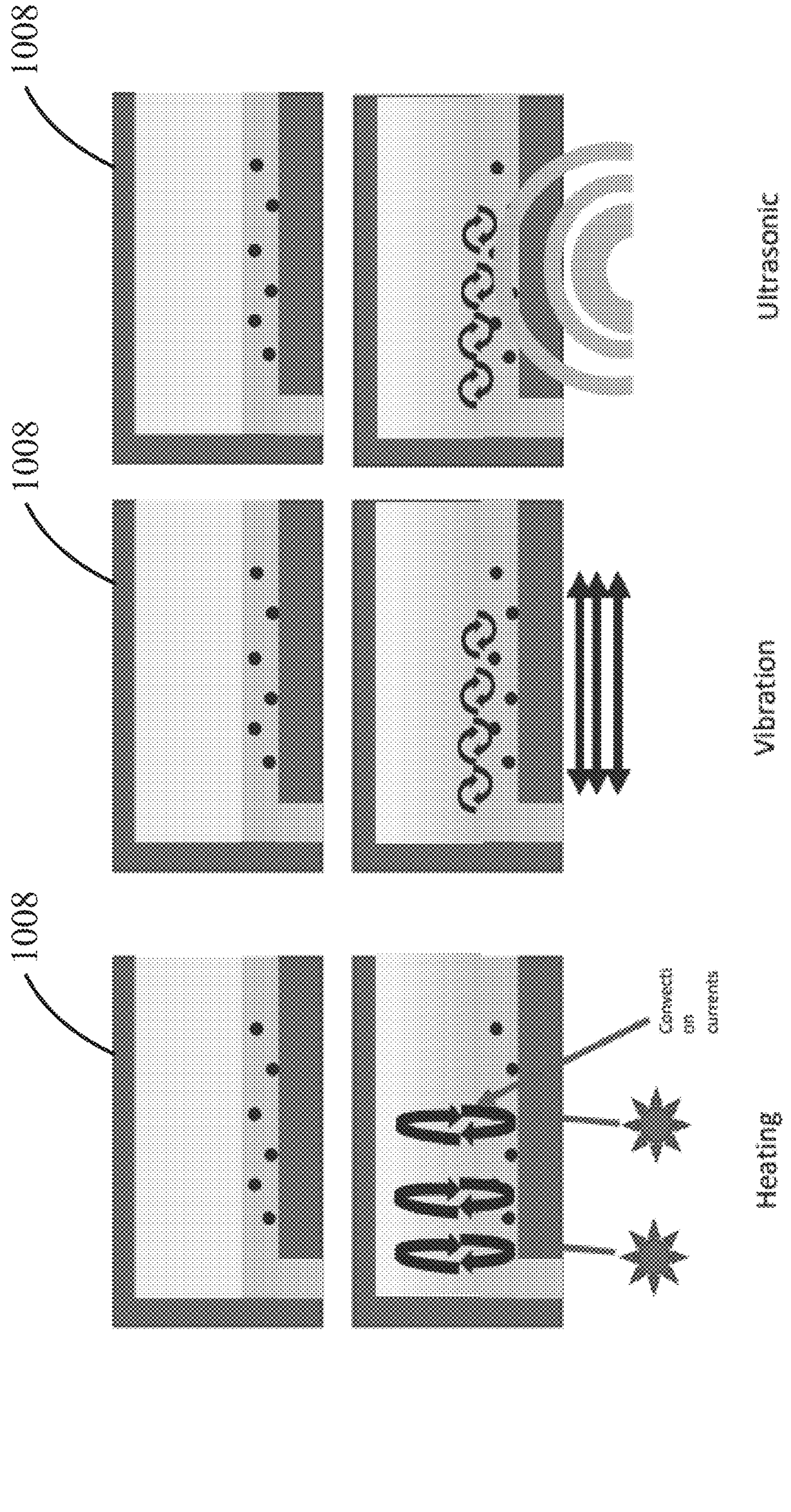
FIG. 17 is an exemplary embodiment of other types of mixing fluids using flow component.

Now referring to FIG. 17, an exemplary embodiment of other types of mixing using flow component 128 is illustrated. In an embodiment, active flow component 216 may be configured to mix first fluid and second fluid as described above. In such embodiment, mixing such as, without limitation, longitude mixing may occur within barrel 1008 of active flow component 216. In a non-limiting example, longitude mixing may include mixing via heat (as shown on the left of FIG. 17). In another non-limiting example, longitude mixing may include mixing via vibration (as shown in the middle of FIG. 17). In a further non-limiting example, longitude mixing may include mixing via ultrasonic. In other non-limiting example, longitude mixing may further include mixing via electromagnetic. Person skilled in the art, upon reviewing the entirety of this disclosure, will be aware of various type of mixing fluids through flow component 128 that may be used for performing microfluidic-based biochemical assays.

Figure 18A:
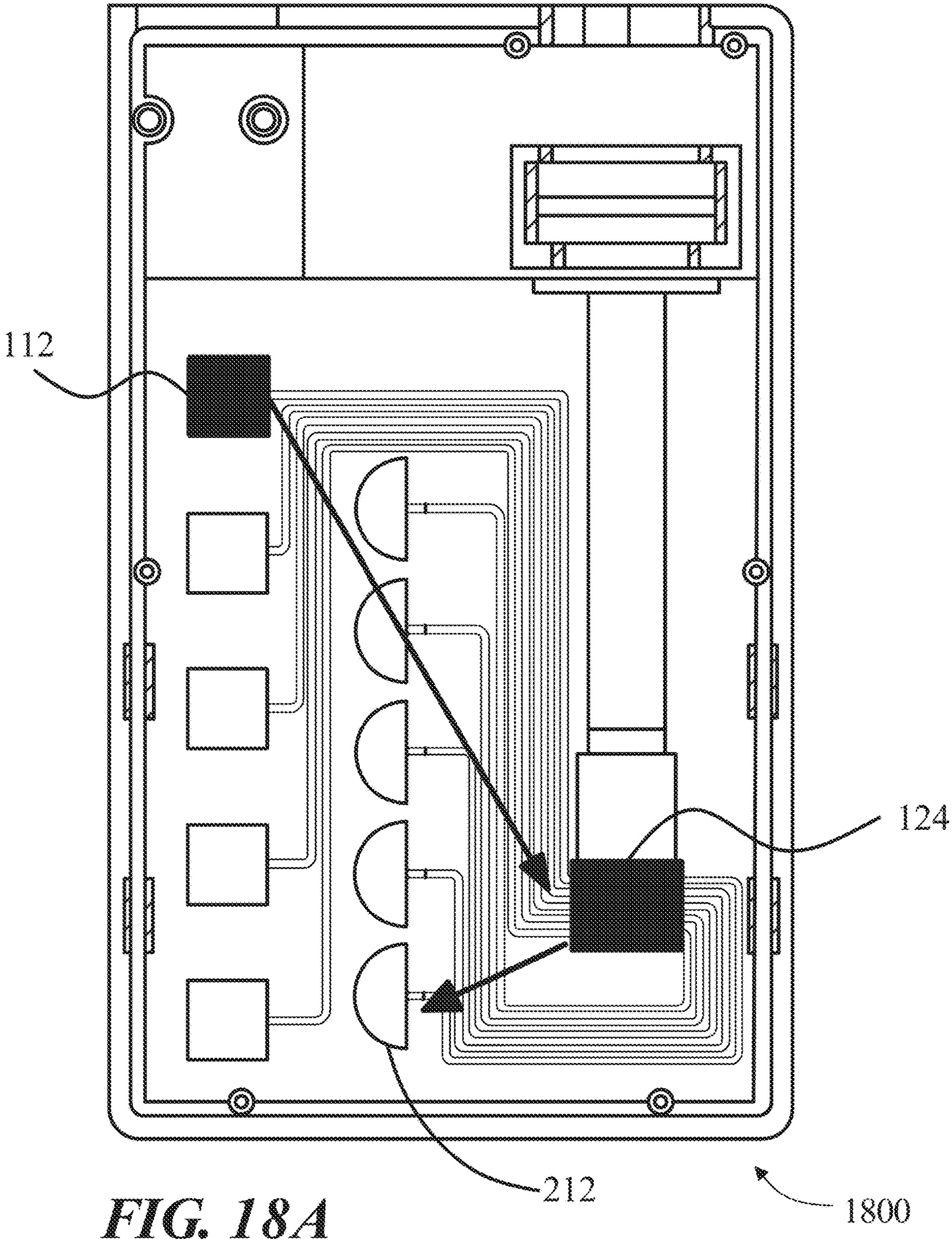
FIGS. 18A-B are exemplary embodiments of a single-step assay performed using the apparatus.
Figure 18B:
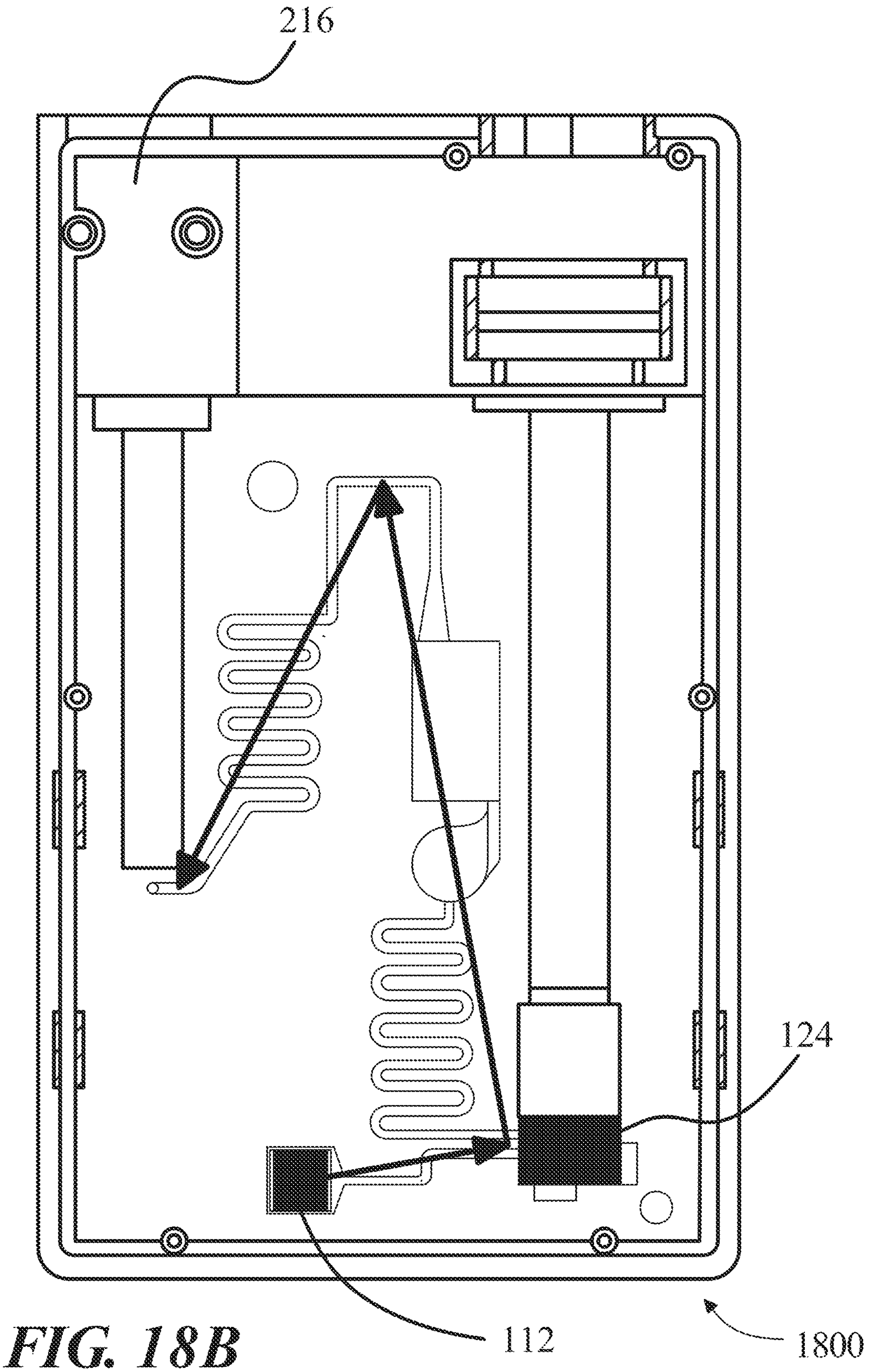

Now referring to FIG. 18A-B, exemplary embodiments of single step assay 1800 performed using apparatus 100 are illustrated. In a non-limiting example, a pre-mixed mixture of reagents and sample may be added to reservoir 112. The mixture then flows through the sensor device 124 driven by a capillary liquid movement driven by a capillary pump 212 such as, without limitation, a wicking effect of a wicking paper at the end of microfluidic feature 108 (as shown in FIG. 18A) or pull regime 1004 of active flow component 216 (as shown in FIG. 18B).

Figure 19:
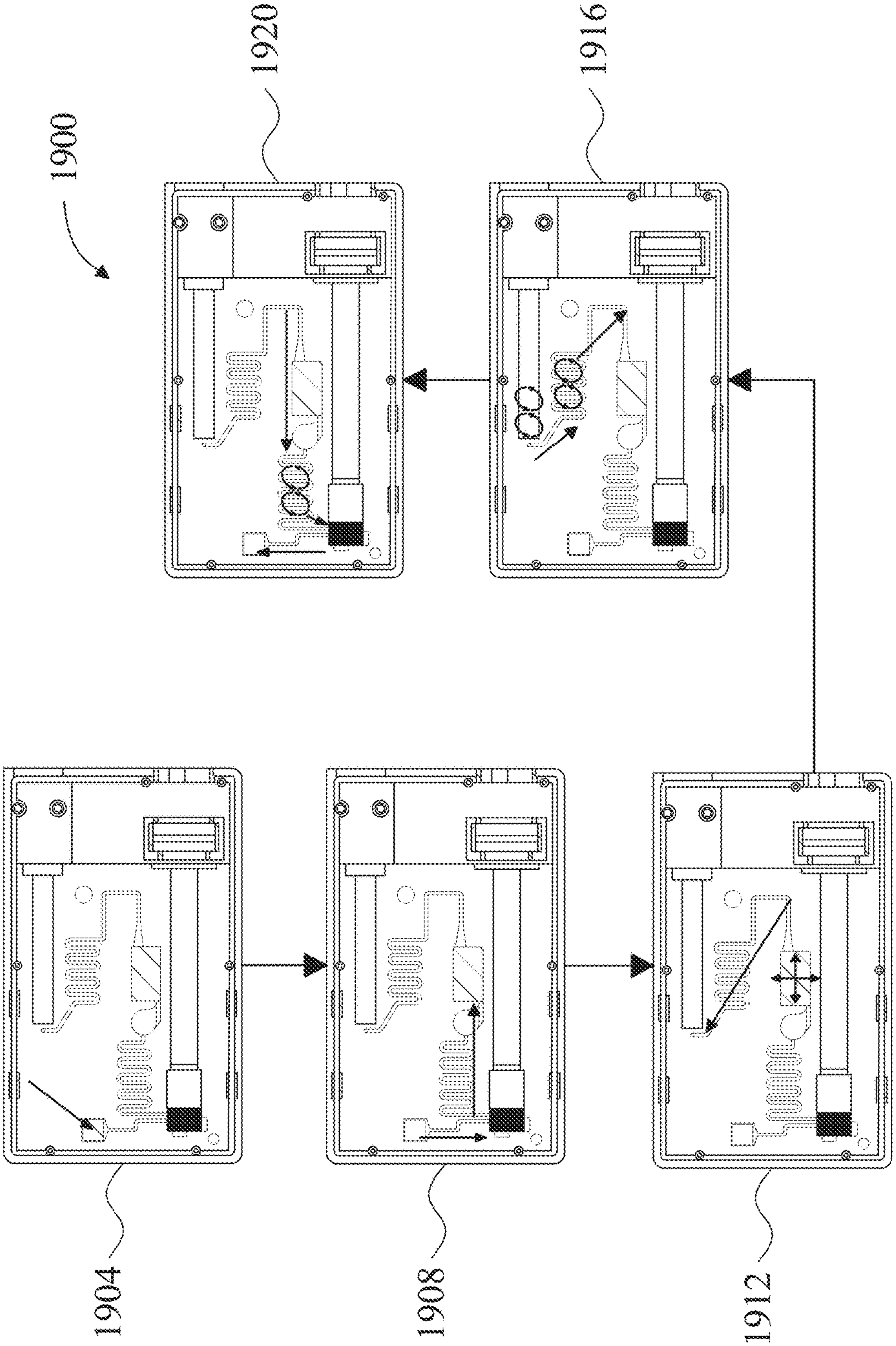
FIG. 19 is an exemplary embodiment of a two-step assay performed using the apparatus.

Now referring to FIG. 19, an exemplary embodiment of a two-step assay 1900 performed using apparatus 100 is illustrated. Two-step assay 1900 may include a step 1904 of adding a sample into reservoir 112. Two-step assay 1900 may include a step 1908 of flowing the sample to conjugate pad 1408 as a function of a reverse flow process initiated by active flow component 216 using pull regime 1004. Two-step assay 1900 may include a step 1912 of releasing a conjugate regent stored in conjugate pad 1408. Two-step assay 1900 may include a step of 1916 of flowing the sample and conjugate regent as a function of forward flow process initiated by active flow component 216 using push regime 1024, wherein flowing the sample and conjugate regent may further include mixing conjugate regent and sample within barrel 1008 of active flow component 216 and/or microfluidic feature 108 after and/or before conjugate pad 1408. Two-step assay 1900 may further include a step 1920 of flowing the mixture of sample and conjugate regent through sensor device 124 and back to reservoir 112.

Figure 20:
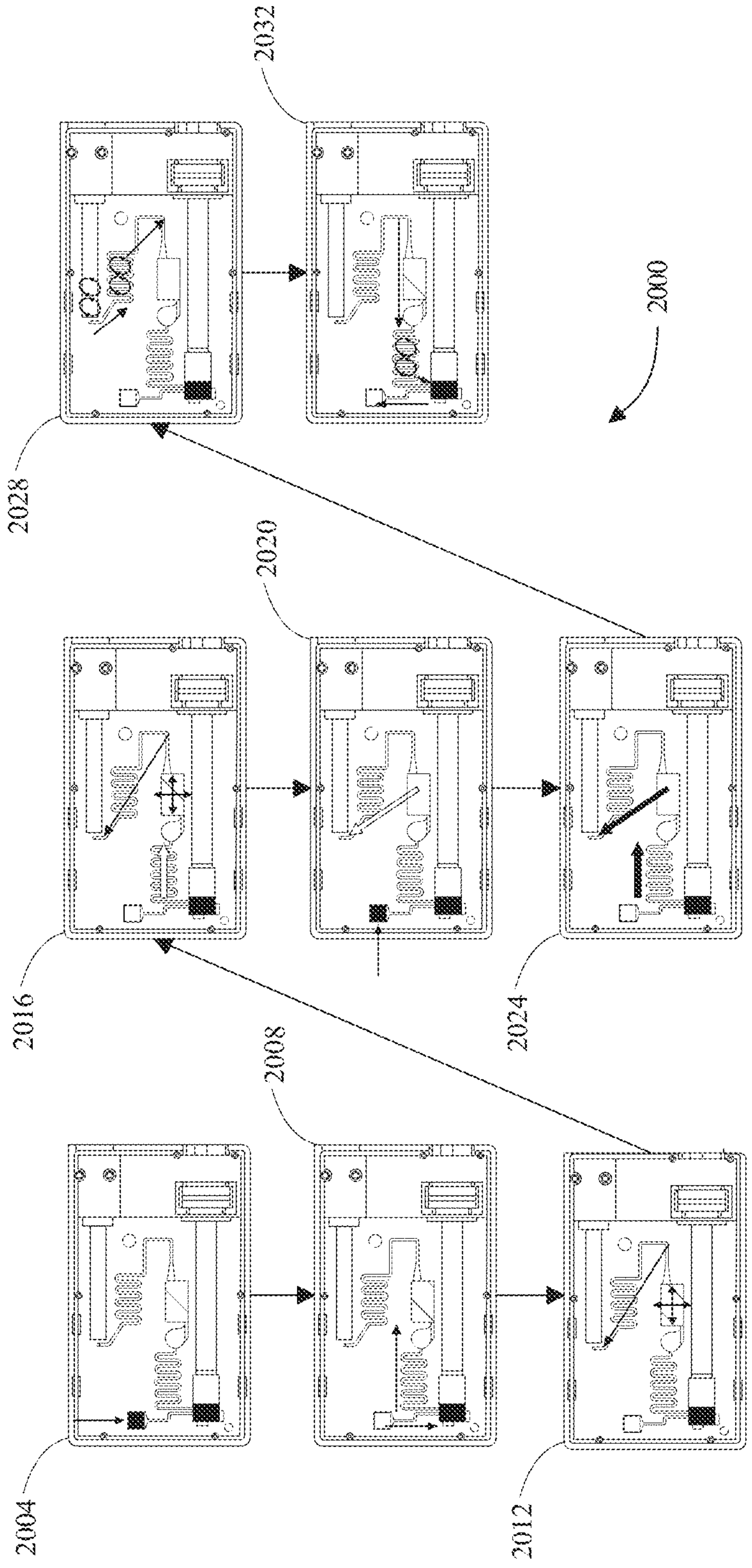
FIG. 20 is an exemplary embodiment of a three-step assay performed using the apparatus.

Now referring to FIG. 20, an exemplary embodiment of a three-step assay 2000 performed using apparatus 100 is illustrated. Three-step assay 2000 may include a step 2004 of adding a sample into reservoir 112. Three-step assay 2000 may include a step 2008 of flowing the sample to conjugate pad 1408 as a function of a reverse flow process initiated by active flow component 216 using pull regime 1004. Three-step assay 2000 may include a step 212 of releasing a conjugate regent stored in conjugate pad 1408. Three-step assay 2000 may include a step 2016 of adding a buffer fluid, driven by pull regime 1004. Three-step assay 2000 may include a step 2020 of receiving buffer fluids, sample, and conjugate regent at active flow component 216. Three-step assay 2000 may include a step 2024 of utilizing an air bubble as a separation barrier between buffer fluid and any regents added later. Three-step assay 2000 may include a step 2028 of flowing received fluids (i.e., pre-mixed regents, conjugate reagent, and sample buffer) as a function of forward flow process initiated by active flow component 216 using push regime 1024, wherein flowing the fluids may further include mixing fluids within barrel 1008 of active flow component 216 and/or microfluidic features 108 after and/or before conjugate pad 1408. Three-step assay 2000 may further include a step 2032 of flowing the mixture through sensor device 124 and back to reservoir 112.

Figure 21:
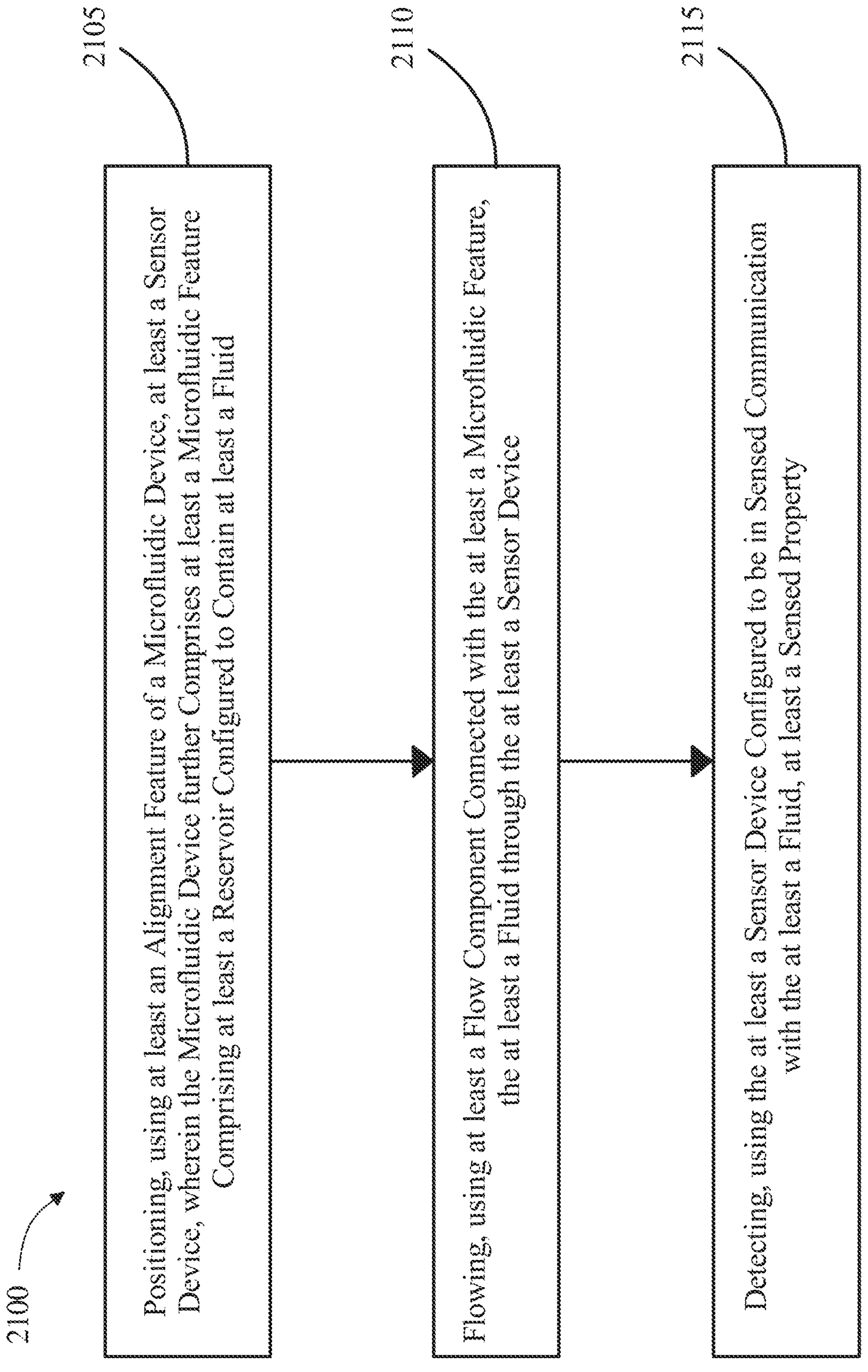
FIG. 21 is an exemplary embodiment of a method for performing microfluidic-based biochemical assay.

Now referring to FIG. 21, a method 2100 for performing microfluidic-based biochemical assays is illustrated. Method 2100 includes a step 2105 of positioning, using at least an alignment feature of a microfluidic device, at least a sensor device, wherein the microfluidic device further includes at least a microfluidic feature containing at least a reservoir configured to contain at least a fluid, and the at least an alignment feature is not contacting the at least a microfluidic feature. This may be implemented, without limitation, as described above in reference to FIGS. 1-20. In some embodiments, the at least an alignment feature may include a housing, and a flat facet located on the housing configured to constraint the at least a sensor device. In some embodiments, the at least an alignment feature may include a sealer. In some embodiments, the at least a sensor device may include an optical device configured to detect an optical property. This may be implemented, without limitation, as described above in reference to FIGS. 1-20.

With continued reference to FIG. 21, method 2100 includes a step 2110 of flowing, using at least a flow component fluidically connected to the at least a microfluidic feature, the at least a fluid through the at least a sensor device, wherein the at least a flow component includes an passive flow component configured to initiate a passive flow process and an active flow component configured to initiate an active flow process. This may be implemented, without limitation, as described above in reference to FIGS. 1-20. In some embodiments, the passive flow component may include a capillary pump. In some embodiments, the active flow component may include a barrel and a plunger disposed within the barrel. In some embodiments, the active flow process may include a reverse flow process and a forward flow process. In some embodiments, the flow component is further configured to mix a first fluid with a second fluid, wherein the first fluid may include a sample with a conjugate reagent and the second fluid may include a buffer fluid. This may be implemented, without limitation, as described above in reference to FIGS. 1-20.

With continued reference to FIG. 21, method 2100 includes a step 2115 of detecting, using the at least a sensor device configured to be in sensed communication with the at least a fluid, at least a sensed property. In some embodiments, the at least a sensor is further configured to communicate with an external device the at least a sensed property. This may be implemented, without limitation, as described above in reference to FIGS. 1-20.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 22:
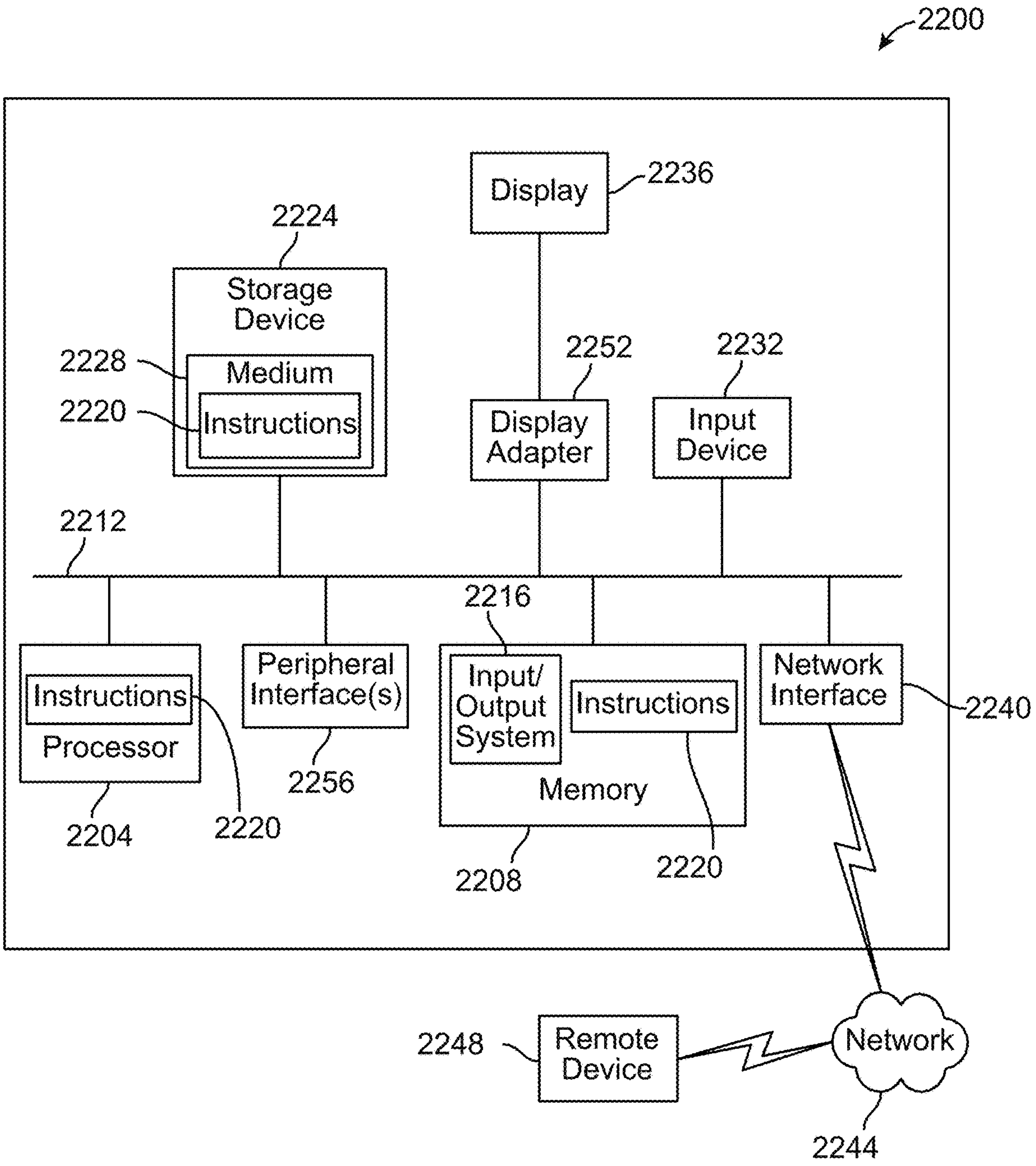
FIG. 22 is a block diagram of a computing system that can be used to implement any one or more of the methodologies disclosed herein and any one or more portions thereof.

FIG. 22 shows a diagrammatic representation of one embodiment of a computing device in the exemplary form of a computer system 2200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2200 includes a processor 2204 and a memory 2208 that communicate with each other, and with other components, via a bus 2212. Bus 2212 may include any of several types of bus structures including, but not limited to, a memory bus, a memory controller, a peripheral bus, a local bus, and any combinations thereof, using any of a variety of bus architectures.

Processor 2204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 2204 may be organized according to Von Neumann and/or Harvard architecture as a non-limiting example. Processor 2204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 2208 may include various components (e.g., machine-readable media) including, but not limited to, a random-access memory component, a read only component, and any combinations thereof. In one example, a basic input/output system 2216 (BIOS), including basic routines that help to transfer information between elements within computer system 2200, such as during start-up, may be stored in memory 2208. Memory 2208 may also include (e.g., stored on one or more machine-readable media) instructions (e.g., software) 2220 embodying any one or more of the aspects and/or methodologies of the present disclosure. In another example, memory 2208 may further include any number of program modules including, but not limited to, an operating system, one or more application programs, other program modules, program data, and any combinations thereof.

Computer system 2200 may also include a storage device 2224. Examples of a storage device (e.g., storage device 2224) include, but are not limited to, a hard disk drive, a magnetic disk drive, an optical disc drive in combination with an optical medium, a solid-state memory device, and any combinations thereof. Storage device 2224 may be connected to bus 2212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2224 (or one or more components thereof) may be removably interfaced with computer system 2200 (e.g., via an external port connector (not shown)). Particularly, storage device 2224 and an associated machine-readable medium 2228 may provide nonvolatile and/or volatile storage of machine-readable instructions, data structures, program modules, and/or other data for computer system 2200. In one example, software 2220 may reside, completely or partially, within machine-readable medium 2228. In another example, software 2220 may reside, completely or partially, within processor 2204.

Computer system 2200 may also include an input device 2232. In one example, a user of computer system 2200 may enter commands and/or other information into computer system 2200 via input device 2232. Examples of an input device 2232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2232 may be interfaced to bus 2212 via any of a variety of interfaces (not shown) including, but not limited to, a serial interface, a parallel interface, a game port, a USB interface, a FIREWIRE interface, a direct interface to bus 2212, and any combinations thereof. Input device 2232 may include a touch screen interface that may be a part of or separate from display 2236, discussed further below. Input device 2232 may be utilized as a user selection device for selecting one or more graphical representations in a graphical interface as described above.

A user may also input commands and/or other information to computer system 2200 via storage device 2224 (e.g., a removable disk drive, a flash drive, etc.) and/or network interface device 2240. A network interface device, such as network interface device 2240, may be utilized for connecting computer system 2200 to one or more of a variety of networks, such as network 2244, and one or more remote devices 2248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2244, may employ a wired and/or a wireless mode of communication. In general, any network topology may be used. Information (e.g., data, software 2220, etc.) may be communicated to and/or from computer system 2200 via network interface device 2240.

Computer system 2200 may further include a video display adapter 2252 for communicating a displayable image to a display device, such as display device 2236. Examples of a display device include, but are not limited to, a liquid crystal display (LCD), a cathode ray tube (CRT), a plasma display, a light emitting diode (LED) display, and any combinations thereof. Display adapter 2252 and display device 2236 may be utilized in combination with processor 2204 to provide graphical representations of aspects of the present disclosure. In addition to a display device, computer system 2200 may include one or more other peripheral output devices including, but not limited to, an audio speaker, a printer, and any combinations thereof. Such peripheral output devices may be connected to bus 2212 via a peripheral interface 2256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A microfluidic device for performing microfluidic-based biochemical assays comprising:

a microfluidic feature comprising a reservoir configured to contain a fluid; and an alignment feature for positioning and for attaching a sensor device, wherein the alignment feature is not in physical contact with the microfluidic feature;

a sensor device comprising a sensor interface comprising a porous member configured to control one or more flows, and wherein the sensor device is configured to communicate with the fluid wherein the sensor device comprises an optical device comprising a resonator configured to detect an optical property using the resonator; and a microfluidic environment comprising:

a bubble trap fluidically connected to the microfluidic feature; and a flow component fluidically connected to the microfluidic feature, wherein the flow component is configured to flow the fluid through the sensor device, and wherein the flow component comprises:

a passive flow component configured to initiate a passive flow process; and an active flow component configured to initiate an active flow process, wherein the active flow component comprises:

a barrel;

a plunger arranged inside the barrel, wherein the plunger is configured to perform a movement inside the barrel wherein the movement of the plunger inside the barrel initiates the active flow process; and a bubble barrier configured to prevent pollutants from migrating between the microfluidic feature and the active flow component and maintain a consistent flow of the active flow process by buffering a steeped action movement of the plunger.

2. The microfluidic device of claim 1, wherein the alignment feature comprises:

a housing; and a flat facet located on the housing wherein the flat facet is configured to constrain the sensor device.

3. The microfluidic device of claim 1, wherein the alignment feature comprises a sealer.

4. The microfluidic device of claim 1, wherein the resonator comprises a microring resonator.

5. The microfluidic device of claim 1, wherein the passive flow component comprises a capillary pump.

6. The microfluidic device of claim 1, wherein the active flow process comprises a reverse flow process or a forward flow process.

7. The microfluidic device of claim 1, wherein the flow component is further configured to:

mix a first fluid with a second fluid, wherein: the first fluid comprises a sample with a conjugate reagent; and the second fluid comprises a buffer fluid.

8. The microfluidic device of claim 1, wherein the sensor is configured to communicate with an external device the optical property.

9. A method for performing microfluidic-based biochemical assays, the method comprising:

positioning a sensor device by using an alignment feature of a microfluidic device, the microfluidic device comprising a microfluidic feature comprising a reservoir configured to contain a fluid; and the alignment feature is is not in physical contact with the microfluidic feature;

flowing, in a microfluidic environment, the fluid through the sensor device, wherein the microfluidic environment comprises:

a bubble trap fluidically connected to the at least a microfluidic feature; and a flow component fluidically connected to the microfluidic feature, wherein the sensor device comprises a sensor interface comprising a porous member configured to control one or more flows, and the flow component comprises: a passive flow component configured to initiate a passive flow process; and an active flow component configured to initiate an active flow process, wherein the active flow component comprises a bubble barrier, wherein the bubble barrier is configured to prevent pollutants between the microfluidic feature and the active flow component and to maintain a consistent flow of the active flow process by buffering a steeped action movement of the plunger wherein the active flow component comprises a barrel and a plunger disposed within the barrel, wherein the plunger performs a movement inside the barrel wherein the movement of the plunger inside the barrel initiates the active flow process; and detecting, using an optical device of the a sensor device configured to communicate with the fluid, wherein the optical device comprises a resonator, an optical property using the resonator.

10. The method of claim 9, wherein the an alignment feature comprises:

a housing; and a flat facet located on the housing wherein the flat facet is configured to constraint the sensor device.

11. The method of claim 9, wherein the an alignment feature comprises a sealer.

12. The method of claim 9, wherein the resonator comprises a microring resonator.

13. The method of claim 9, wherein the passive flow component comprises a capillary pump.

14. The method of claim 9, wherein the active flow process comprises a reverse flow process or a forward flow process.

15. The method of claim 9, further comprising mixing a first fluid with a second fluid wherein the flow component is configured to mix the first fluid with the second fluid wherein the first fluid comprises a sample with a conjugate reagent and the second fluid comprises a buffer fluid.

16. The method of claim 9, further comprising communicating the optical property with an external device wherein the sensor is configured to communicate with the external device the optical property.

17. The microfluidic device of claim 1, wherein the bubble trap is integrated in a conjugate pad configured to control a reagent delivery.

18. The method of claim 9, further comprising controlling a delivery of a reagent using a conjugate pad integrated in the bubble trap wherein the bubble trap is integrated in the conjugate pad configured to control a reagent delivery.

* * * * *